United States Patent
Otsubo et al.

(10) Patent No.: US 6,636,925 B1
(45) Date of Patent: Oct. 21, 2003

(54) BUS INTERFACE CIRCUIT PREPARATION APPARATUS AND RECORDING MEDIUM

(75) Inventors: Motohide Otsubo, Tokyo (JP); Kazutoshi Wakabayashi, Tokyo (JP); Yuichi Maruyama, Kawasaki (JP)

(73) Assignee: NEC Electronics Corporation, Kanagawa (JP)

( * ) Notice: Subject to any disclaimer, the term of this patent is extended or adjusted under 35 U.S.C. 154(b) by 443 days.

(21) Appl. No.: 09/686,928

(22) Filed: Oct. 11, 2000

(30) Foreign Application Priority Data

Oct. 14, 1999 (JP) .................................... 11-292913

(51) Int. Cl.[7] .................... G06F 13/14; G06F 12/00; H02H 3/05; G11C 29/00
(52) U.S. Cl. .................. 710/305; 710/308; 710/310; 711/146; 711/202; 711/205; 711/206; 711/207; 711/208; 711/209; 714/6; 714/7; 714/718; 714/719
(58) Field of Search .................. 710/305, 4, 9, 710/19, 26, 110, 308, 310; 711/146, 202, 205, 206, 207, 208, 209; 714/6, 7, 718, 719

(56) References Cited

U.S. PATENT DOCUMENTS

| | | | | |
|---|---|---|---|---|
| 4,550,368 A | * | 10/1985 | Bechtolsheim | 711/206 |
| 5,630,093 A | * | 5/1997 | Holzhammer et al. | 711/202 |
| 5,761,740 A | * | 6/1998 | Johnson et al. | 711/202 |
| 6,289,470 B1 | * | 9/2001 | Tanaka | 714/5 |

* cited by examiner

Primary Examiner—Tim Vo
(74) Attorney, Agent, or Firm—Foley & Lardner

(57) ABSTRACT

An apparatus for automatically preparing a bus interface preparation apparatus is provided which is capable of preventing duplication of addresses of registers and memories. When data of a hardware description 10 are input into the extracting portion 101, the extracting portion 101 extracts from the data whether the memory element is a memory device or an FF. The extracting portion 101 reads the top address and the address size of the memory element when the memory is the memory element and reads address when the memory is an FF, and the thus read data are output to the address competition detecting portion 103. The address competition detecting portion 103 detects competition of the addresses by determining whether the address information stored in the bit data memory portion 102 includes 1. The output portion 104 converts the data concerning address of the memory into a description language of the hardware of the bus interface circuit.

11 Claims, 22 Drawing Sheets

BUS INTERFACE CIRCUIT PREPARATION APPARATUS AND RECORDING MEDIUM

BACKGROUND OF THE INVENTION

1. Field of the Invention

The present invention relates to a bus interface preparation apparatus for preparing a bus interface circuit provided between a central processing unit which constitutes a master and hardware which constitutes slaves for the central processing unit.

2. Background Art

Conventionally, when designing a bus interface circuit between the central processing unit (hereinafter, called CPU) 400 as a master and a hardware (hereinafter, called HW) 1 and HW2 as slaves for the master, as shown in FIG. 25, addresses (hereinafter, called global addresses) to be read and written from CPU to memories and to registers are arranged based on the text form 410 or a table form 411, shown in FIG. 26. In addition, based on the text form 410 or the table form 411, the designer describes the interface circuit by hardware description language and the like. It is noted that the bus interface circuit is constituted by address decoders as a whole provided for respective memories and registers provided between the CPU as the master, and hardware as slaves for the master, and each address decoder comprises an enable signal generating circuit and an address conversion circuit.

However, since the addresses have been arranged in text form or in table form, when it is necessary to add a new register or new memory, when modifying the address of the described register, or when it is necessary to modify the top address of a memory, or the memory size, it is necessary to confirm whether there is a overlapping portion in the registers or the memories for correcting the addresses every time.

Such modifications of the addresses may be carried out for several times depending on the designer's will, and are troublesome and may cause errors, and thus imposes a burden on the designer of the apparatus.

Furthermore, for the registers and memories for reading and writing from the CPU, a variety of cases are encountered such as the usage of a different addresses for reading and writing, and the case that the data are divided into a plurality of bits for allocating these bits to different addresses. In such a complicated address designation, description errors are liable to occur and the description operations become complicated.

Therefore, it is required to provide a tool, capable of preventing duplication of the addresses, treating complicated address designations, and automatically generating a bus interface circuit from the address map.

SUMMARY OF THE INVENTION

It is therefore, an object of the present invention to provide a bus interface circuit preparation apparatus, capable of preventing duplication of addresses in the registers and memories of the bus interface circuit and also capable of facilitating the visual confirmation of the address arrangement on an image screen such as a display.

Another object of the present invention is to provide a bus interface preparation apparatus capable of automatically preparing a simplified bus interface circuit even when a complicated addresses are designated.

Another object of the present invention is to provide a bus interface circuit preparation apparatus, capable of warning the user about the duplication of the addresses and the generation of hardware that is not preferable for the area if the display.

According to its first aspect, the present invention provides a bus interface circuit preparation apparatus, which outputs a hardware description language expressing said bus interface circuit by inputting a bus interface description including a memory element, which is disposed between the central processing unit constituting a master and hardware constituting a slave for said central processing unit, comprising: an extracting portion for extracting data related to the address of said memory element; a bit data memory portion for storing the address allocated to said memory element based on the data extracted by said extracting portion; and an address competition detecting portion for detecting duplication of the address in the memory element based on the data extracted by said extracting portion, and the address information stored in said bit data memory portion.

According to the second aspect, the bus interface circuit preparation apparatus, which outputs a hardware description language expressing said bus interface circuit by inputting a bus interface description including a memory element, which is disposed between the central processing unit constituting a master and hardware constituting a slave for said central processing unit, comprises: an RW address comparison portion for determining whether the reading global address and the writing global address, both allocated to the same memory element, are identical, based on the inputting bus interface description; a determination portion for determining whether said reading global address and said writing global address are divided to form different addresses in the bit unit; and a select signal generating circuit for outputting a select signal which becomes active when said global address is assigned, providing that said reading global address and said writing global address are identical and that said global addresses are different addresses in the bit unit, and a circuit generating potion for generating conversion circuits corresponding to each of said global addresses for converting said global addresses to local addresses of said memory element.

According to the third aspect, the bus interface circuit preparation apparatus, which outputs a hardware description language expressing said bus interface circuit by inputting a bus interface description including a memory element, which is disposed between the central processing unit constituting a master, and hardware constituting a slave for said central processing unit, comprises: an RW address comparison portion for determining whether or not the reading address and the writing address, both allocated to the same memory element, are identical; a determination portion for determining whether said reading global address and said writing global address are divided to form different addresses in the bit unit; a select signal generating circuit for outputting the select signal which becomes active when said global address is assigned, providing that said reading global address and said writing global address are different addresses and that respective addresses of said reading global address are identical to said writing global address, and a circuit generating potion for generating conversion circuits corresponding to said writing global address and said writing global address for converting said global addresses to local addresses of said memory element.

According to the fourth aspect, the bus interface circuit preparation apparatus, which outputs a hardware description language expressing said bus interface circuit by inputting a bus interface description including a memory element, which is disposed between the central processing unit constituting a master and a hardware constituting a slave for said central processing unit, comprises: a RW address comparison portion for determining whether the reading address and the writing address, both allocated to the same memory element, are identical; a determination portion for determining whether said reading global address and the writing global address are divided to form different addresses in the bit unit; and a select signal generating circuit for outputting the select signal which becomes active when any one of said reading global address and said writing global address, which forms different addresses in the bit unit, is assigned, providing that said reading global address and said writing global address are different addresses and that at least any one of said reading global address and said writing global address forms different addresses in the bit unit, and a circuit generating potion for generating conversion circuits corresponding to each of said reading global address and to each of said writing global addresses for converting said global address to local addresses of said memory element.

According to the fifth aspect, in the bus interface circuit preparation apparatus according to the first aspect, said apparatus comprises: an extracting portion for extracting data related to global addresses of said select signal; and an address determining portion for determining the number of upper digits which are identical from the top address, when said reading global address and the writing global address are represented by n-ary notation based on the data extracted by said address extracting portion, and when both reading and writing global addresses after conversion to the n-ary notation are compared from the top address; and a common circuit generating portion for generating a common circuit of said select signals corresponding to the number of upper digits determined by said address determining portion.

According to the sixth aspect, the bus interface circuit preparation apparatus, which outputs a hardware description language expressing said bus interface circuit by inputting a bus interface description including a memory element which is disposed between the central processing unit constituting a master, and hardware constituting a slave for said central processing unit, comprises: an extracting portion for extracting a top global address and an address range for said memory elements from the inputting bus interface description; a calculating portion for calculating the number of the minimum address lines which is capable of assigning any address in said address range extracted by said extracting portion; a checker portion for detecting whether all of the lower n bits are 0; and a circuit generating portion for outputting the select signal, using the lower n bits of said global addresses as the address input of said memory element and utilizing said global address values excluding the lower n bits, when said checker portion has determined that all of the lower n bits are 0.

According to the seventh aspect, the bus interface circuit preparation apparatus, which outputs a hardware description language expressing said bus interface circuit by inputting a bus interface description including a memory element, which is disposed between the central processing unit constituting a master, and hardware constituting a slave for said central processing unit, comprising: an extracting portion for extracting the top global address and the address range of said memory element from the bus interface description; a calculating portion for calculating the number of minimum address lines, capable of assigning individually any address within said address range extracted by said extracting portion; a checker portion for detecting whether the lower n bits of the top address of said memory element; and a warning portion for warning when 1 is present in said lower n bits.

According to the eighth aspect, a computer readable recording medium which stores a bus interface circuit preparation program for outputting a hardware description language expressing said bus interface circuit by inputting a bus interface description including a memory element, which is disposed between the central processing unit constituting a master, and hardware constituting a slave for said central processing unit, wherein the bus interface circuit preparation program operated by a computer comprises: an extracting step for extracting data related to the address of said memory element from the inputting bus interface description; a bit data storing step for storing the address allocated to said memory element based on the data extracted by said extracting portion; an address competition detecting step for detecting duplication of the address in the memory element based on the data extracted by said extracting portion and information stored in said bit data storing step.

According to the ninth aspect, the computer readable recording medium which stores a bus interface circuit preparation program for outputting a predetermined hardware description language by inputting a bus interface description including a memory element, which is disposed between the central processing unit constituting a master and hardware constituting a slave for said central processing unit, wherein the bus interface circuit preparation program comprises; an RW address comparing step for determining whether the reading global address and the writing global address, both allocated to the same memory element, are identical, based on the inputting bus interface description; a determining step for determining whether or not said reading global address and said writing global address are divided to form different addresses in the bit unit; and a circuit generating step for outputting the select signal when said global address is assigned, providing that said reading global address are identical with said writing global address and that said global addresses are different addresses in the bit unit, and for generating conversion circuits corresponding to each of said global addresses for converting said global addresses to local addresses of said memory element, when necessary; a circuit generating step for outputting the select signal which becomes active when any one of said two global addresses are assigned, providing that said reading global address and said writing global address are different addresses and that respective addresses of said reading global address are identical with said writing global address, and a circuit generating step for generating conversion circuits corresponding to said writing global address and said writing global address for converting said global addresses to local addresses of said memory element; a circuit generating step for generating a select signal generating circuit for outputting the select signal which becomes active when any one of said reading global address and said writing global address, which forms different addresses in the bit unit, is assigned, providing that said reading global address and said writing global address are different addresses and that at least any one of said reading global address and said writing global address forms different addresses in the bit unit, and a conversion circuit generating step for generating conversion circuits corresponding to each of said reading global addresses and to each of said writing global addresses for converting said global addresses to local addresses of said memory element.

According to the tenth aspect, in the computer readable recording medium for storing a bus interface circuit preparation program according to the ninth aspect, said bus interface circuit preparation program comprises: an address extracting step for extracting data related to the global address of said select signal generated in the extracting portion; an address determination step for determining whether these reading and writing global addresses agree with each other from the upper address based on data extracted by said address extracting step; a common circuit generating step for generating a common circuit of the above select signal when the result of said address determination step confirms the agreement.

According to the eleventh aspect, the computer readable recording medium which stores a bus interface circuit preparation program for outputting a predetermined hardware description language by inputting a bus interface description including a memory element, which is disposed between the central processing unit constituting a master, and hardware constituting a slave against said central processing unit, wherein the bus interface circuit preparation program comprises; an extracting portion for extracting the top global address and the address range of said memory element from the bus interface description; a calculating portion for calculating the number of minimum address lines, capable of assigning individually any address within said address range extracted by said extracting portion; a checker portion for detecting whether the lower n bits of the top address of said memory element; a circuit generating step for outputting a select signal, by using the lower n bits as an address input of the memory element, when the result of determination in said check step indicates that the lower n bits of the top global address are all 0; and a warning step to warn the user when the result of the check step indicates that 1 is present in the lower n bits of the top address.

DETAILED DESCRIPTION OF THE INVENTION

Figure 1:
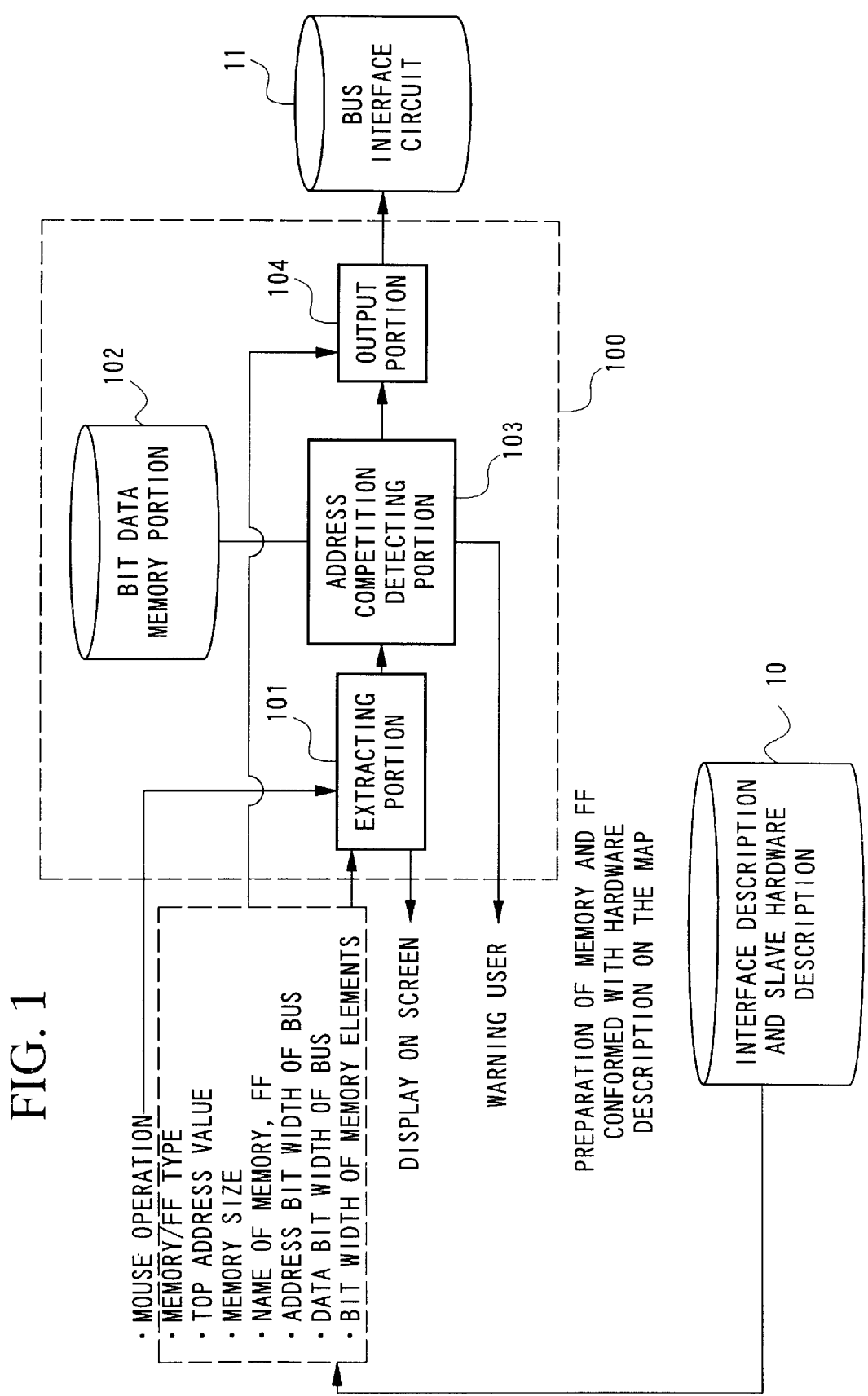
FIG. 1 is a schematic block diagram showing the system to which a bus interface circuit preparation apparatus of the present invention is applied.

Hereinafter, a bus interface circuit preparation apparatus according to one embodiment of the present invention is described with reference to the attached drawings. FIG. 1 is a schematic block diagram showing the system to which a bus interface circuit preparation apparatus of the present invention is applied.

In this embodiment, an example of the apparatus using the memory and register devices is described. In particular, an example is described using a flip-flop (hereinafter, called FF) as the register.

Reference numeral 101 denotes an extracting portion for extracting address information of the memory elements from the externally input bus interface description and the slave hardware description 10. Here, the bus interface description means the description of the memory elements when viewed from the bus interface at the side of CPU, and the slave hardware description means a description of the memory element when viewed from the slave side hardware. The extracting portion 101 extracts the type, the name, the top address of memory elements, the address bus bit width, the data bus bit width, the size of the memory, the address value of the FF from data of the bus interface description and the slave hardware description 10, and outputs these to the address competition detecting portion 103, and outputs also these on the display screen based on the extracted data.

Figure 2:
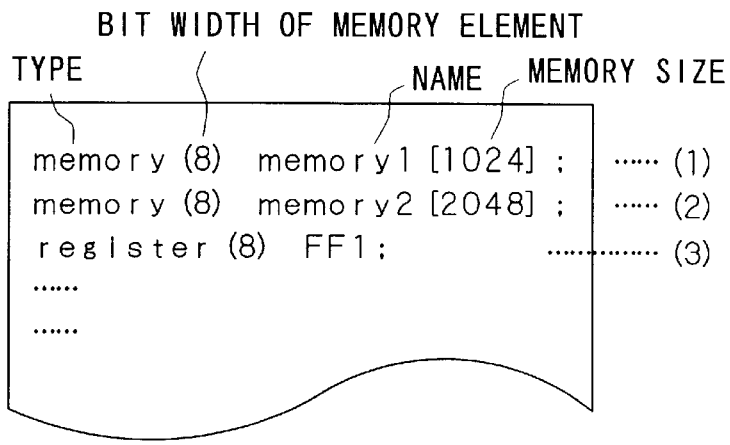
FIG. 2 shows an example of the hardware description input into the extracting portion 101, and the description is related to the memory element viewed from a slave hardware unit.
Figure 3:
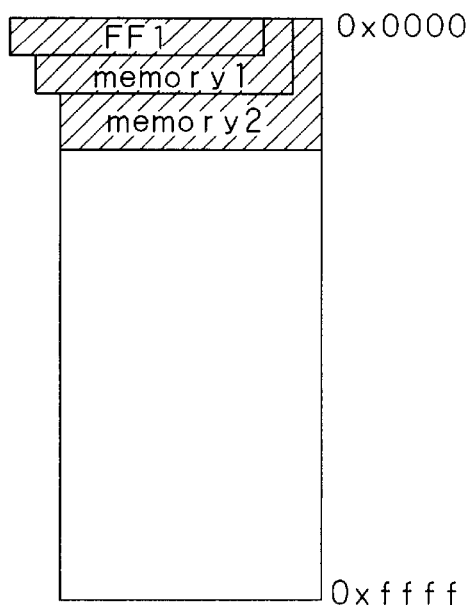
FIG. 3 is a diagram showing the description of the hardware in FIG. 2 illustrated on a screen.

Next, as an example of the bus interface description which is the data related to the bus interface and the slave hardware description, the case of only including the slave hardware description is explained with reference to FIG. 2. In this figure, the first line (FIG. 2, (1)) of the declarative statement defines a memory element, in which, the bit width is 8 bits, and the size is 1024 bites, and the type is the memory 1. The second line (FIG. 2, (2)) of the declarative statement defines a memory element, in which the bit width is 8, the size is 2048, the name is the memory 2, and the type is the memory. In such a slave hardware description, a practical example displayed in the display screen by the extracting portion 101 is shown in FIG. 3. In this case, since the respective top addresses of the memory 1, memory 2, and FF1 are not designated, these are allocated and displayed at the address of 0x0000.

Figure 4:
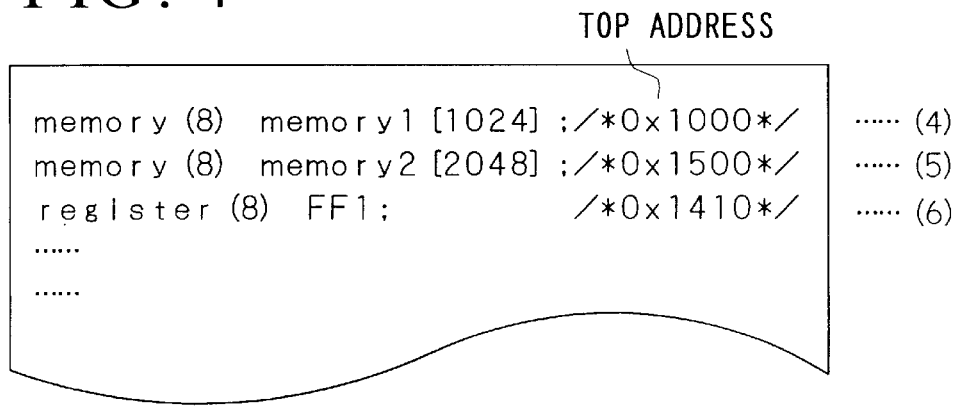
FIG. 4 shows an example of a bus interface description input into the extracting portion 101, and the description is related to the memory elements viewed from a bus interface on the side of CPU.
Figure 5:
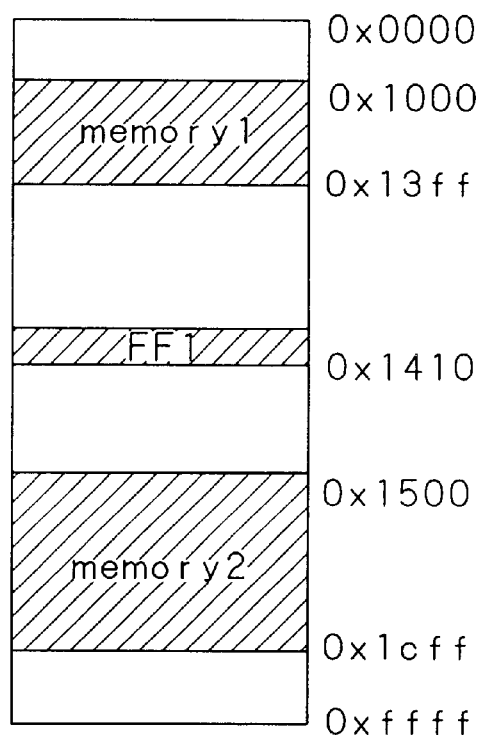
FIG. 5 is a diagram of the hardware description in FIG. 4 is illustrated on a screen.

Next, the case in which the bus interface description is described in the bus interface description and the slave hardware description will be explained with reference to FIGS. 4 and 5. The first line (FIG. 4, (4)) of the declarative statement in FIG. 4 defines the memory element as having a bit width of 8, a top address of 0x1000, and the size of 1024 bites, and the name of the memory 1, and its type is memory. In addition, similarly the second line (FIG. 4, (5)) defines a memory device as having a bit width of 8, a top address of 0x1500, a size of 2048 bites, the name of memory 2, and the type of memory. The third line (FIG. 4, (6)) defines a memory element having a bit width of 8, the name of FF1, the address of 0x1410, and the type of register. FIG. 5 shows an example of the display indication output by the extracting portion 101 when such a hardware description is stated. In this figure, the respective elements of the memory 1, memory 2 and FF1 are arranged at respective addresses, and the state of allocation of the respective addresses can be visually confirmed.

Figure 6:
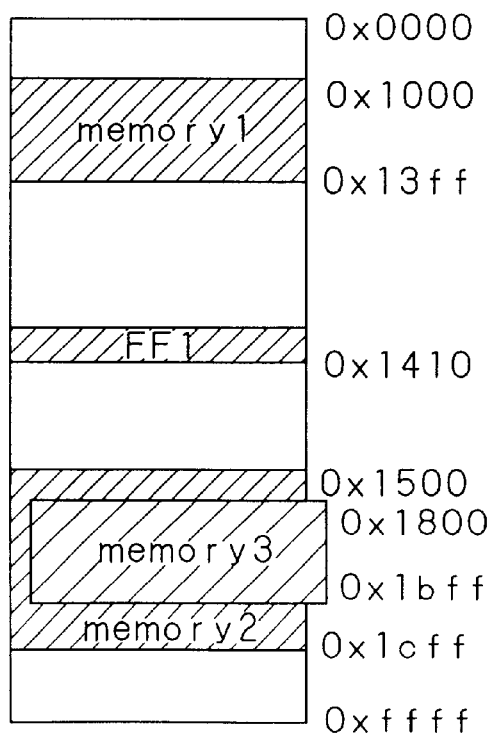
FIG. 6 shows a diagram indicating the addition of a memory element by operating the mouse.

In addition, it is possible to add data to the display screen such as the image screen shown in FIG. 5. For example, if a memory element, defined with the name of memory 3, a bit width of 8, the size of 1024 bites, and the type memory, is prepared, and when the memory 3 is moved to the address 0x1800 by the mouse, the result is illustrated on the screen as shown in FIG. 6. The data of the memory element added as described above is also stored in the extracting portion 101.

Figure 7:
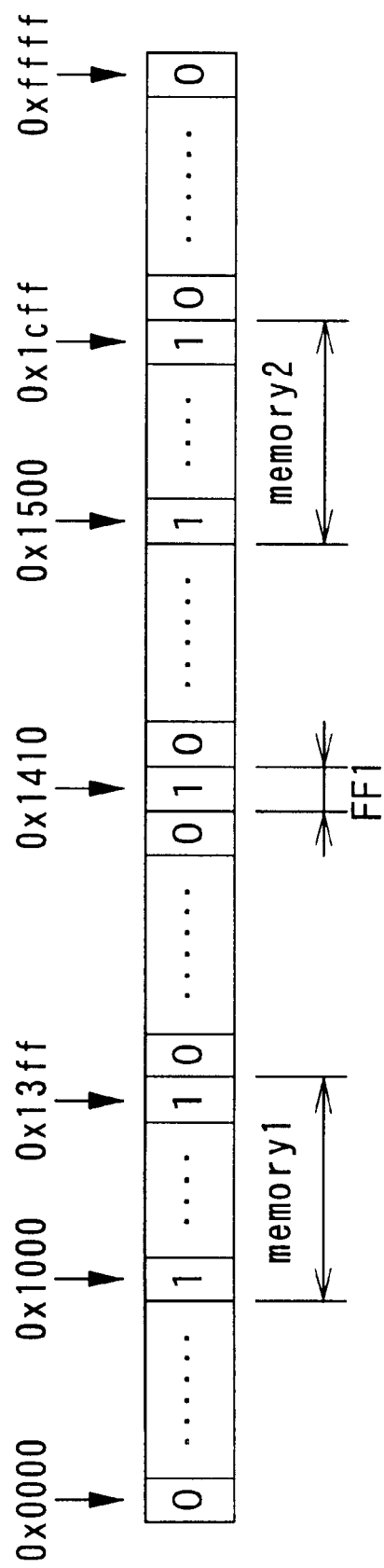
FIG. 7 shows the storing state for each address of the bit data memory portion 102.

As shown in FIG. 7, the bit data memory portion 102 stores "0" when the memory element such as the memory or the register are not allocated to each address of the memory region; and stores "1" when the memory elements are allocated. It is also possible for the bit data memory portion 102 to store the name of the memory elements. A preferable data structure as a method for storing data in the bit data memory portion 1–2 is to store the use state of the address, and it is possible, for example, to represent the address range in use by a binary tree.

The address competition detecting portion 103 detects whether the newly allocated addresses of the memory elements is duplicated with the previously allocated addresses of the memory elements. That is, it is detected whether "1" is stored in the addresses of the bit data memory portion 102, which corresponds to the newly allocated memory element. When "0" is stored in the address of the bit data memory portion 102, the memory elements are allocated and the data on the address corresponding to the bit data memory portion 102 is updated to "1" from "0", and outputs data concerning the type, the name, the top address, the address bit width, data bus bit width, and the memory size of the memory element to the output portion 104. In contrast, when "1" is stored in the bit data memory portion 102, the address competition detecting portion 103 detects the duplication of the address and warns the user about the duplication. The warning may be executed by changing the indicating color or the indicating location of the newly allocated memory element. It is also possible to add a warning sound at the time of changing the indication. It is noted that the data output to the output portion 104 may or may not be executed. In addition, it is also possible to leave it up to the user whether the data is output to the output portion 104.

The output portion 104 outputs after converting the data including the address of the memory element output from the address competition detecting portion 103 into a hardware description language, a circuit diagram, or a symbol connection diagram.

Figure 8:
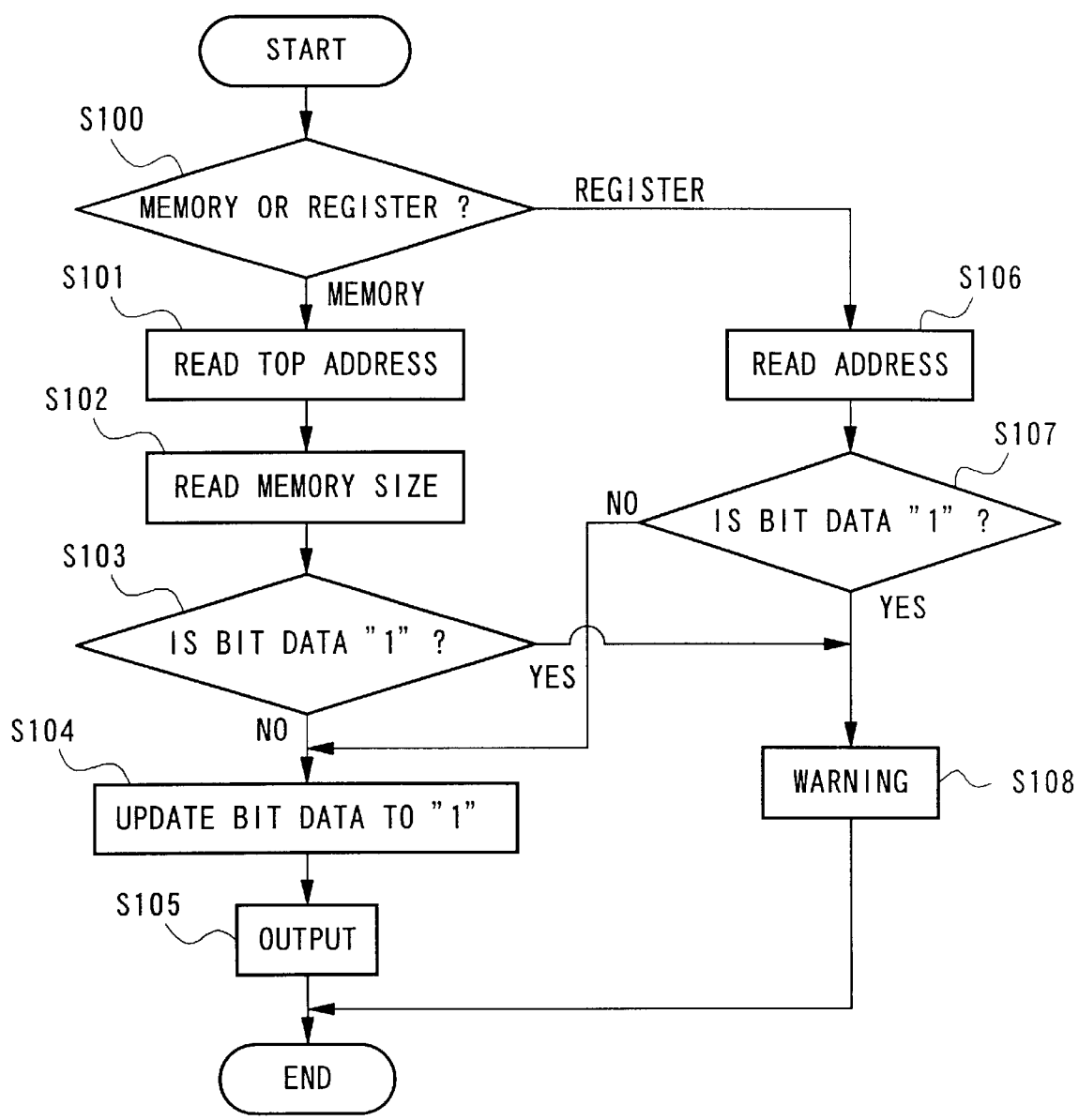
FIG. 8 is a flowchart explaining the operation of the system to which the bus interface circuit preparation apparatus 100 is applied.

Next, the operation of the bus interface circuit preparation apparatus constituted as shown above is described with reference to FIG. 8. Here, an explanation is provided in which the data related to the bus interface description and the slave hardware description 10 are the declarative statement shown in FIG. 4. The initial values of the bit data memory portion are "0".

First, when the bus interface description data is input into the extracting portion 101, the extracting portion 101 extracts whether the data is a memory element or FF (step S100). In this case, since it is defined that the type is a memory element, the extracting portion 101 reads the top address (step S101), the memory size (step S102), and outputs the read data to the address competition detecting portion 103.

The address competition detecting portion 103 detects whether the address is in competition based on the data output from the extracting portion 101. That is, the address competition detecting portion 103 detects whether "1" is stored in the address information stored in the bit data memory portion 102 for the address and the memory size output from the extracting portion 101 (step S103). In the present case, since the 1024 bites from the address 0x1000 to the address 0x13ff are "0", the stores from the address 0x1000 to the address 0x13ff are updated to "1" (step S104). The address competition detecting portion 103 outputs the name of the memory element and the data about the address is output to the output portion 104.

The output portion 104 outputs after converting the data concerning the address of the memory element output from the address competition detecting portion 103 into the hardware description language of the bus interface circuit, the circuit diagram, or the symbol connection diagram (step S105).

Next, when the data (5) is input into the extracting portion 101, the extracting portion 101 extracts from the data whether the type of the memory element is memory or FF (step S100). In the present case, since it is defined that the type is memory, the extracting portion 101 reads the top address (step S101), and subsequently read the size of the memory (step S102), and outputs the read data to the address competition detecting portion 103.

The address competition detecting portion 103 detects based on the data (5) output from the extracting portion 101 whether the address is in competition.

That is, the address competition detecting portion 103 detects whether "1" is stored in the address information stored in the bit data memory portion 102 for the addresses and the memory size output from the extracting portion 101 (step S103). In the present case, since the memory region in the bit memory portion 102 having the size of 2048 bites from the address 0x1500 to the address 0x1cff is "0", the address competition detecting portion 103 updates the stores from the address 0x1500 to the address 0x1cff to "1". In addition, the address competition detecting portion 103 outputs the name of the memory element and the data concerning the addresses to the output portion 104.

The output portion 104 outputs after converting the data including addresses of the memory elements and so on output from the address competition detecting portion 103 into the hardware description language of the bus interface circuit, a circuit diagram, or the symbol connection diagram (step S105).

Subsequently, when the data (6) is input into the extracting portion 101, the extracting portion 101 extracts from the data (6) whether the memory element is a memory or a register (step S100). In the present case, since it is defined that the type is a register, the extracting portion 101 reads the address (step S106), and outputs the read data to the address competition detecting portion 103.

The address competition detecting portion 103 detects based on the data output from the extracting portion 101 whether the address is in competition. That is, it is detected whether "1" is stored in the address information stored in the bit. data memory portion 102 for the addresses output from the extracting portion 101 (step S107). In the present case, since the address 0x1410 stored in the bit data memory portion 102 is "0", the address competition detecting portion 103 updates the store in the address 0x1410 to "1" (step S104). The address competition detecting portion 103 output the name of this memory element and the data related to the address to the output portion 104.

Subsequently, the output portion 104 outputs after converting the data concerning the address and the like of the memory element into hardware description language of the bus interface circuit, a circuit diagram, or a symbol connection diagram (step S105).

It is noted that the above-described operation may be repeated for each data described in the hardware description 10, or the operation may be substituted by reading the data collectively and outputting collectively after sequential processing.

Figure 9:
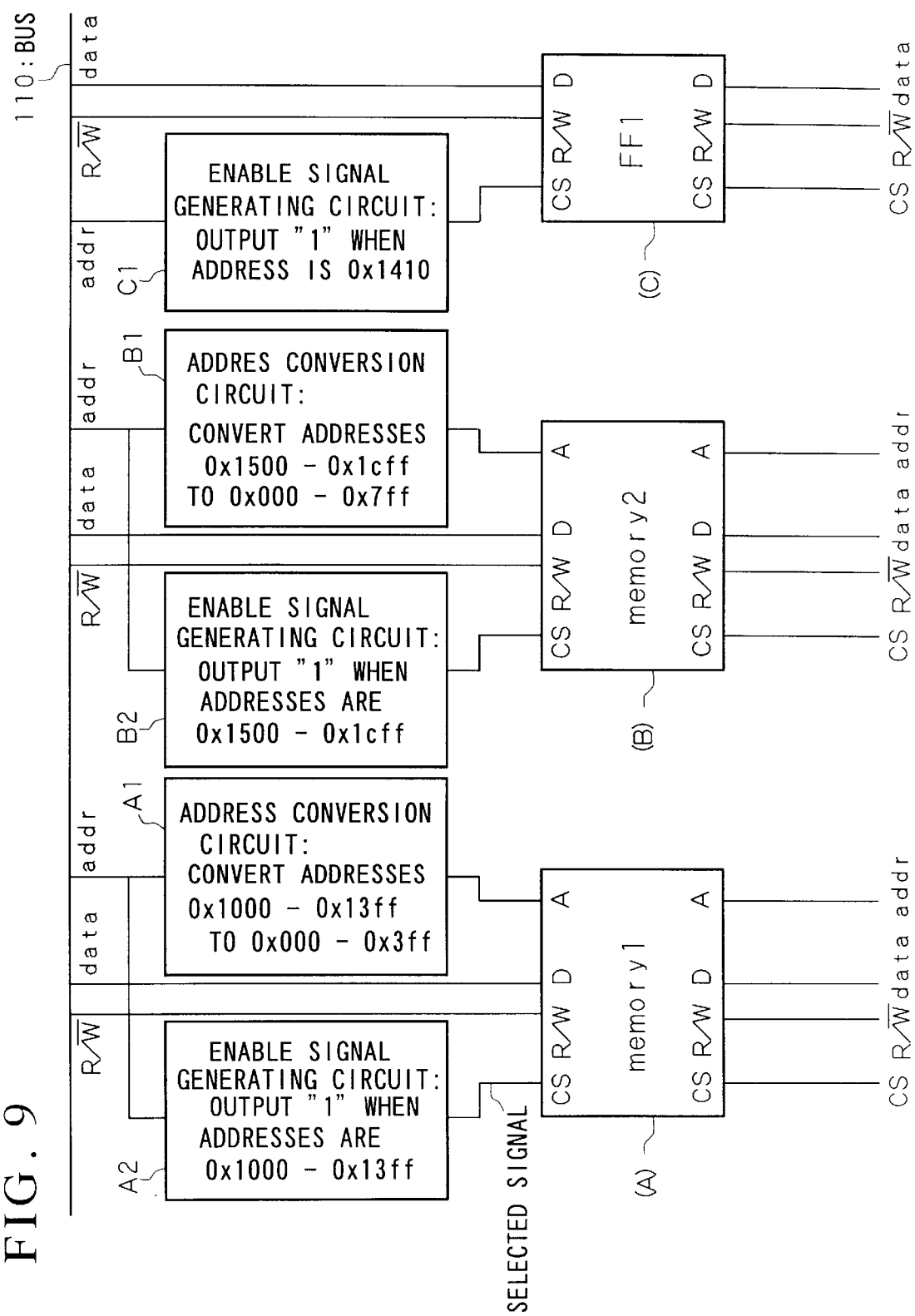
FIG. 9 is an example of the bus interface circuit output by the bus interface circuit preparation apparatus 100.

The circuit diagram output by the above-described operation is, for example, shown in FIG. 9. The bus 110 is connected to the CPU as the master, and the terminal disposed under the memory 1, memory 2, and FF1 is connected to the slave hardware. Furthermore, the memory 1 (reference symbol (A) in the FIG. 9, and hereinafter called symbol (A)), memory 2 (symbol (B)), and FF1 (symbol (C)) are connected to the bus 110 through the interface circuit output by the above-described operation. Below, the connection relationships are explained in detail.

The A (address) terminal of the memory 1 (symbol (A)) is connected to an output terminal of the address conversion circuit A1 which converts the addresses ranging from 0x1000 to 0x3ff output from the addr (address) terminal to 0x000 to 0x3ff. The CS (chip select) terminal of the memory 1 (symbol (A)) is connected to the output terminal of the enable signal generating circuit A2 for outputting "1" when the output addresses from the bus 110 are from the address 0x1000 to the address 0x13ff. In addition, the R/W bar terminal and the data terminal of the bus 110 are connected respectively to the R/W terminal (symbol (A)) and the D (data) terminal of the memory 1. Here, the W bar represents the reversed signal of the write signal and is represented by drawing a bar on the letter W.

Next, the address terminal of memory 2 (symbol (B)) is connected to an output terminal of the address conversion circuit B1 which converts the addresses ranging from 0x1500 to 0x1cff output from the addr (address) terminal to the addresses ranging from 0x000 to 0x3ff. The CS (chip select) terminal of the memory 2 is connected to the output terminal of the Enable signal generating circuit A2 which output the active signal of "1" when the addresses output from the bus 110 ranges from 0x1000 to 0x13ff. In addition, the R/W bar terminal of the bus 110 and the D (data) terminal are respectively connected the R/W terminal and the D (data) terminal of memory 2.

The CS (chip select) terminal of FF1 (symbol (C)) is connected to the output terminal of the enable signal generating circuit C1, when the address output from the addr (address) terminal of the bus 110 is 0x1410. In addition, the R/W terminal and the data terminal of the bus 110 are respectively connected to the R/W bar terminals and D (data) terminal of the FF1 (symbol (C)).

Figure 10:
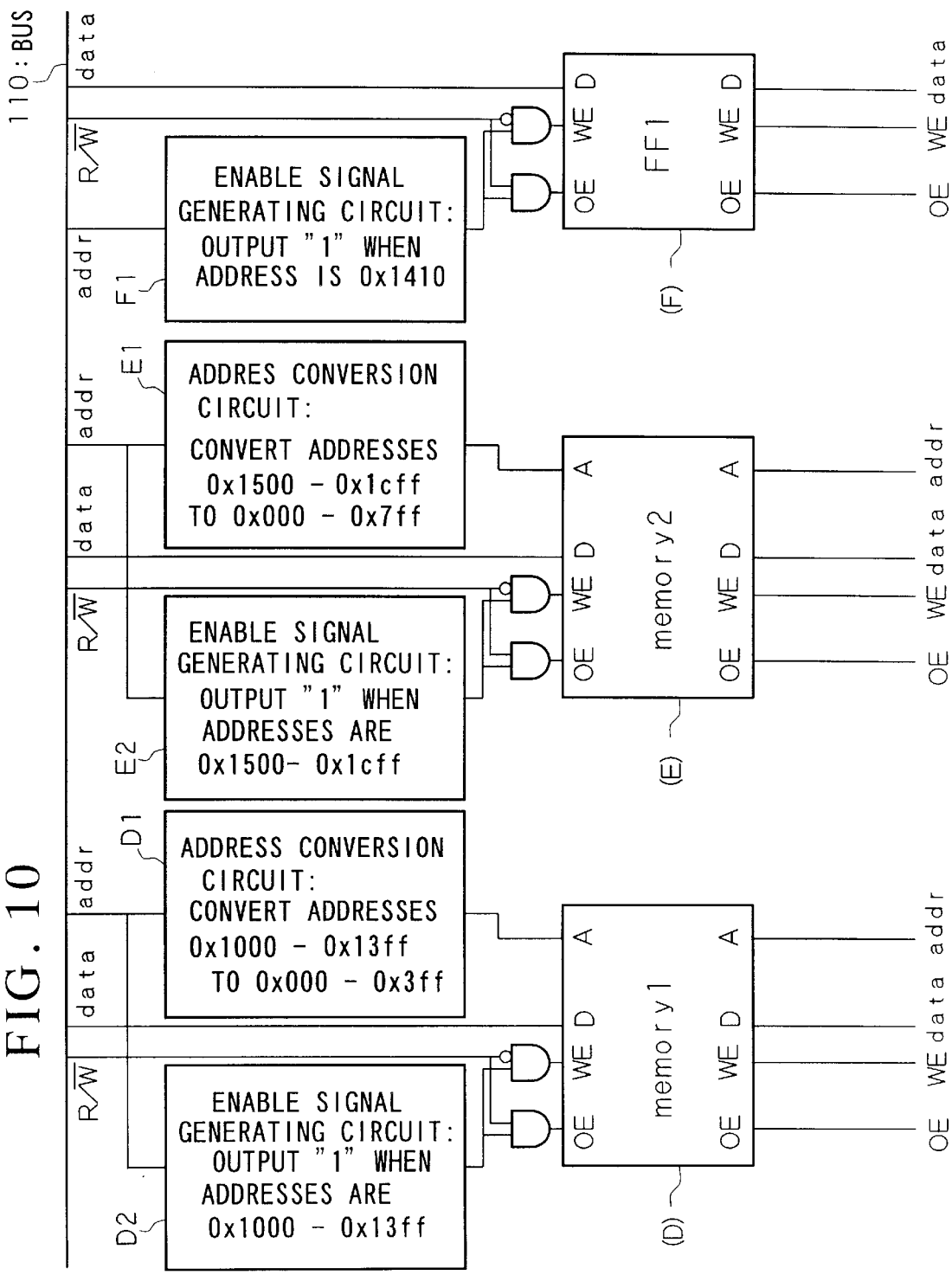
FIG. 10 is an example of the bus interface circuit output by the bus interface circuit preparation apparatus 100.

The symbol connection diagram, which is output by the output portion is shown in FIG. 10, when the memory 1, memory 2 and FF1 possess an OE (output enable) terminal and WE (write enable) terminal, respectively.

In FIG. 10, the bus 110 is connected to the CPU as the master. The memory 1 (symbol (D)), memory 2 (symbol (E)) and FF1 (symbol (F)) are connected to the bus 110 through the bus interface circuit.

First, the A (address) terminal of the memory 1 (symbol (D)) is connected to the output terminal of the address conversion circuit D1 which converts the addresses from 0x1000 to 0x13ff output from the addr (address) terminal of the bus 110 into the addresses from 0x000 to 0x3ff. The addr (address) terminal of the bus 110 is connected to the Enable signal generating circuit D2 which outputs an active signal of "1" when the addresses output from the bus 110 ranges from 0x000 to the 0x13ff. Furthermore, when the R/W bar signal is "1", that is, when reading, the output signal of the above-described Enable signal generating circuit is input into the OE (output enable) terminal of the memory 1. When the R/W bar signal is "0", that is, when writing, the output signal of the above-described Enable signal generating circuit is input into the WE (write enable) terminal of the memory 1. Furthermore, the data terminal of the bus 110 is connected to the D (data) terminal of the memory 1 (symbol (D)).

Next, the A (address) terminal of the memory 2 (symbol (E)) is connected to the output terminal of the address conversion circuit E1 which converts the addresses from 0x1500 to 0x1cff output from the addr (address) terminal of the bus 110 into the addresses from 0x000 to 0x7ff. The addr (address) terminal of the bus 110 is connected to the Enable signal generating circuit D2 which outputs an active signal of "1" when the addresses output from the bus 110 ranges from 0x1500 to the 0x1cff. Furthermore, when the R/W bar signal is "1", that is, when reading, the output signal of the above-described Enable signal generating circuit is input into the OE (output enable) terminal of the memory 1. When the R/W bar signal is "0", that is, when writing, the output signal of the above-described Enable signal generating circuit is input into the WE (write enable) terminal of the memory 2 (symbol (E)). Furthermore, the data terminal of the bus 110 is connected to the D (data) terminal of the memory 21 (symbol (E)).

Next, the case of FF1 is described below. The addr (address) terminal of the bus 110 is connected to the Enable signal generating circuit which outputs the active signal of "1" when the address output from the bus 110 is 0x1410. When the R/W bar signal output from the bus 110 is "1", that is, when reading, the output signal of the above-described Enable signal generating circuit is input into the OE (output enable ) terminal of the memory 2 (symbol (E)). When the W/R bar signal output from the bus 110 is "0", that is, when writing, the output of the Enable signal generating circuit is input into the WE (write enable) terminal of the memory 2 (symbol (E)). Furthermore, the data terminal of the bus 110 is connected to the D (data) terminal of the memory 2 (symbol (E)).

Next, an explanation is provided related to the FF1 (symbol (F)). The addr (address) terminal of the bus 110 is connected to the Enable signal generating circuit, which outputs the active signal of "1" when the address output from the bus 110 is 0x1410. The output signal of the above-described Enable signal generating circuit is input into the OE (output enable) terminal of the FF1 (symbol (F)) when the R/W bar signal output from the bus 110 is "1"; and the output signal of the Enable signal generating circuit is input into the WE (write enable) terminal of the FF1 (symbol (F)) when the R/W signal is "0", that is, when writing.

As described above, a bus interface circuit is generated in accordance with the data input as the slave hardware description.

Next, a description is provided for explaining a case when the bus interface description and the slave hardware description 10 are data input on a display screen such as the image shown in FIG. 5. It is assumed that a memory element is formed, which is defined such that the name is memory 3, the type is a memory, the top address is 0x2800, and the size is 1024 bites. when the top address of this memory 3 is moved to 0x1800, the necessary data for indicating the memory 3 is stored in the extracting portion 101, and the image shown in FIG. 6 is displayed on the screen. Here, the memory region ranging from address 0x2800 to 0x2bff in the bit data memory portion 102 is updated to "0". When the data related to address etc. after being moved by the mouse are input into the extracting portion 101, the extracting portion 101 extracts whether the memory element is a memory or a register (step S100). In the present case, the type of the memory element in the name of the memory 3 is a memory, the extracting portion 101 reads the top address (step S101), reads the memory size (step S102), and outputs the read data to the address competition detecting portion 103.

The address competition detecting portion 103 detects whether the addresses are in competition based on the data output from the extracting portion. That is, it is detected whether "1" is stored in the address information stored in the bit data memory portion 102 for the addresses and the memory size output from the extracting portion 101 (step S103). In the present case, the data for the addresses ranging from 0x1800 to 0x1bff are "1", which indicates that this region is already allocated to the memory 2. Thereby, the address competition detecting portion 103 determines that the addresses is duplicated and warns the user of the duplication (step S108). It is noted that the modification of the address may be executed by the keyboard input not by operating the mouse. In addition, it is possible to warn the user of the duplication by a procedure identical to that when inputting a bus interface description whose addresses are duplicated.

Figure 11:
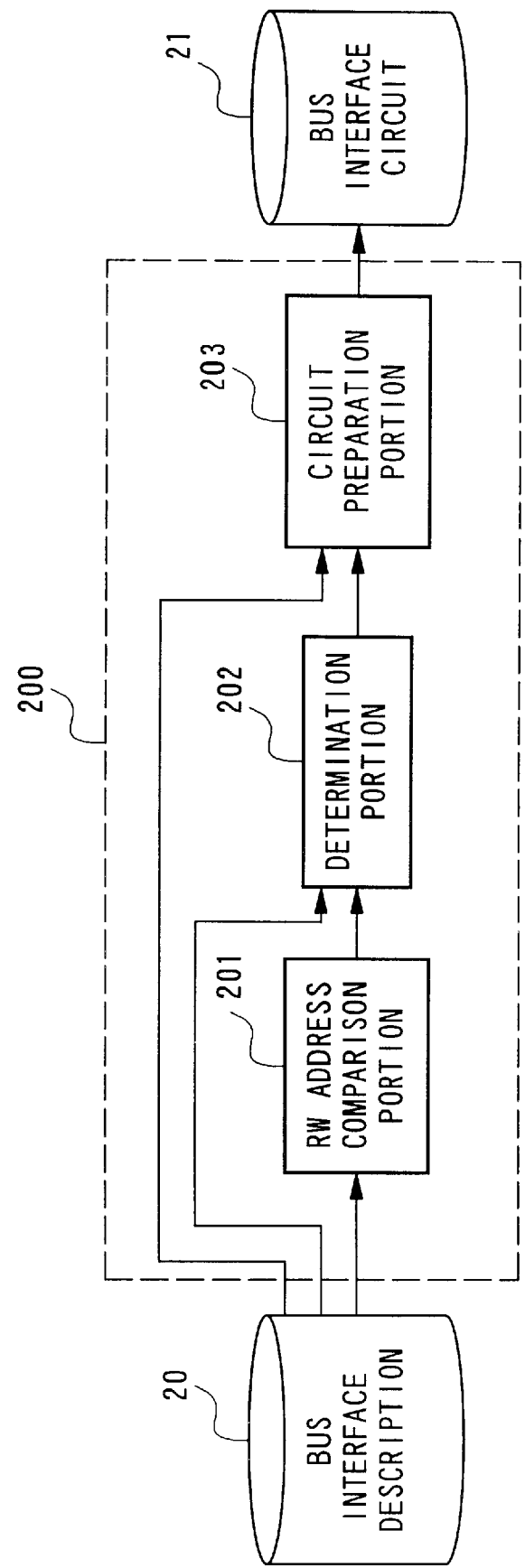
FIG. 11 is a schematic block diagram showing a system to which the bus interface circuit preparation apparatus 200 is applied.

FIG. 11 is a block diagram showing a system to which the bus interface circuit preparation apparatus according to the second embodiment of the present invention is applied.

Figure 12:
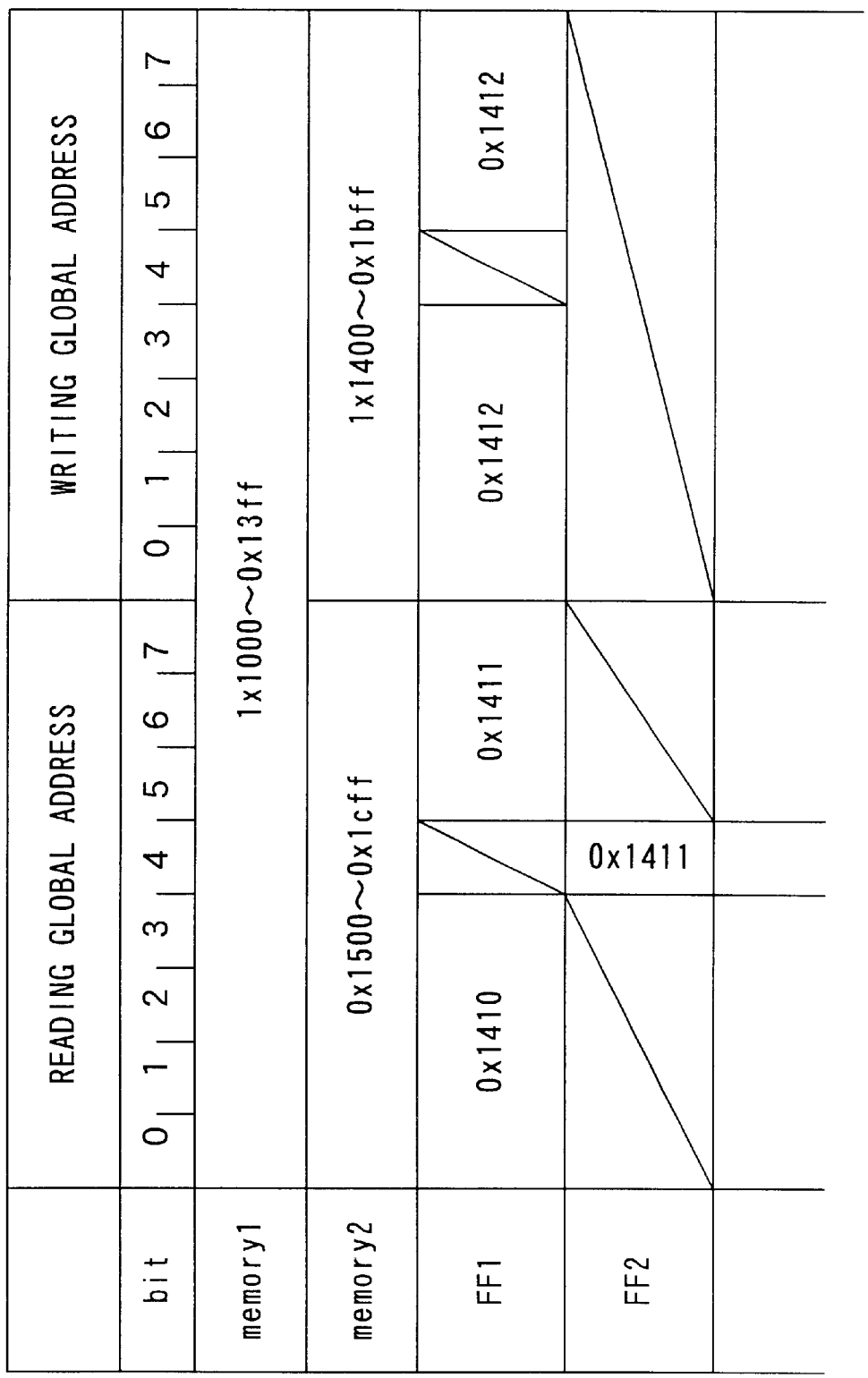
FIG. 12 is an example of the bus interface description 20 to be input into the bus interface circuit preparation apparatus 200.

An example of the bus interface circuit preparation description 20 to be input into this bus interface circuit preparation apparatus is shown in FIG. 12. In this figure, the reading global address and writing global address for the memory 1, memory 2, FF1, and FF2 are defined, and the reading global address and the writing global address are divided by the bit unit. It is noted that the slashed portions of the address notation portion mean that the address region is not used.

Reference numeral 201 denotes a RW address comparison portion which determines whether the reading global address and the writing global address are identical. Reference numeral 202 denotes a determining portion which determines whether or not the global addresses are separated into different bit addresses. Reference numeral 203 denotes a circuit generating portion for generating an Enable signal generating circuit and an address conversion circuit, and for outputting a bus interface circuit 21 based on the comparison result by the RW address comparison portion 201 and the determination result of the determination portion 202 (the details will be described later).

Figure 13:
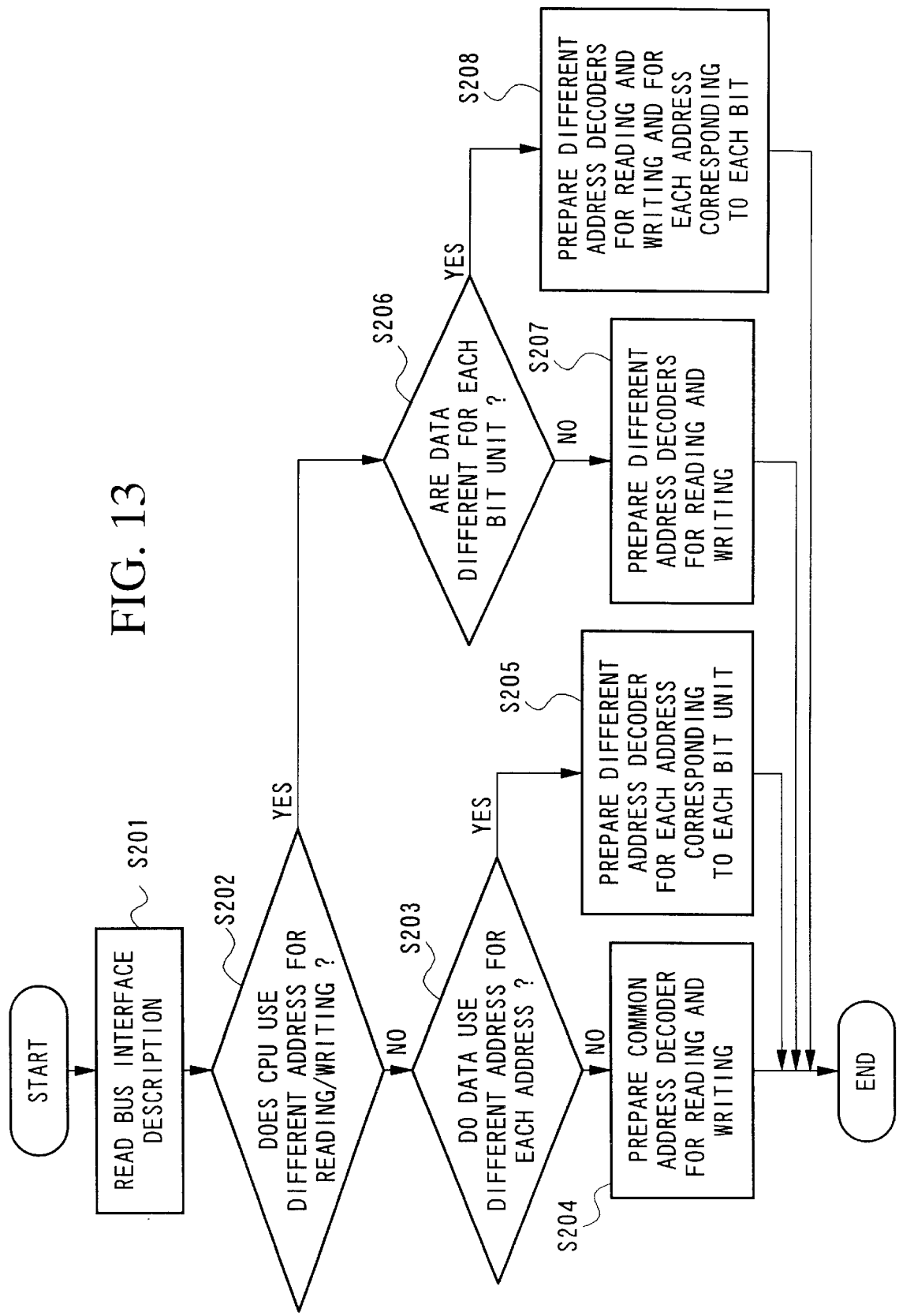
FIG. 13 is a flow-chart explaining the operation of the system to which the bus interface circuit reparation apparatus 200 shown in FIG. 11 is applied.

Next, the operation of the apparatus constituted as described above will be described with reference to FIG. 13.

First, once the bus interface description of the memory 1 in FIG. 12 is input (step S201), the RW address comparison portion 201 determines whether the reading global address and the writing global address are identical (step 202). When the reading global address is identical to the writing global address, the determining portion determines whether the reading global address and the writing global address are separated to different bit addresses in the bit units (step S203). In the memory 1, the reading global address and the writing global address are the same, and respective bit addresses of the reading global address in bit unit are the same as the bit addresses of the writing global address in the bit unit. Accordingly, based on this determination result, the circuit generating portion 203 prepares an address decoder which is common for reading and writing from CPU (step S204).

Subsequently, when the bus interface description of the memory 2 is input (step S201), the RW address comparison portion 201 determines whether the reading global address and the writing global address are identical (step S202). When the reading global address and the writing global address are not identical, the determining portion 202 determines whether each bit of reading global addresses and each bit of the writing global bit addresses are the same (step S206). In the case of memory 2, the reading global address and the writing global address are not identical, and every respective bit of the reading global address and the writing global address are identical. Thus, based on this determining result, the circuit generating portion 203 prepares different decoders for the reading global address and the writing global address (step S207).

Subsequently, when the bus interface description of the FF1 is input (step S201), the RW address comparison portion 201 detects whether or not the reading global address and the writing global address are identical (step S202). When the reading global address and the writing global address are not identical, the determining portion 202 determines whether or not each bit of the reading global addresses and each bit of the writing global bit addresses are identical to each other (step S206). In the case of FF1, the reading global address and the writing global address are not identical, and every respective bit of the reading global address and the writing global address are different. Thus, based on this determining result, the circuit generating portion 203 prepares different decoders for the reading global address and the writing global address, and address decoders are prepared separately for every bit of the reading global address and the writing global address (step S208).

Subsequently, when the bus interface description of the FF2 is input (step S201), the RW address comparison portion 201 detects whether or not the reading global address and the writing global address are identical (step S202). When the reading global address and the writing global address are not identical, the determining portion 202 determines whether each bit of reading global addresses and each bit of the writing global bit addresses are identical to each other (step S206). In the case of FF2, there is only the reading global address, and the address of the reading global address is defined for the particular bits. Thus, based on the result of the above determination, the circuit generating portion 203 prepares an address ecoder for the reading global address (step S208).

Figure 14:
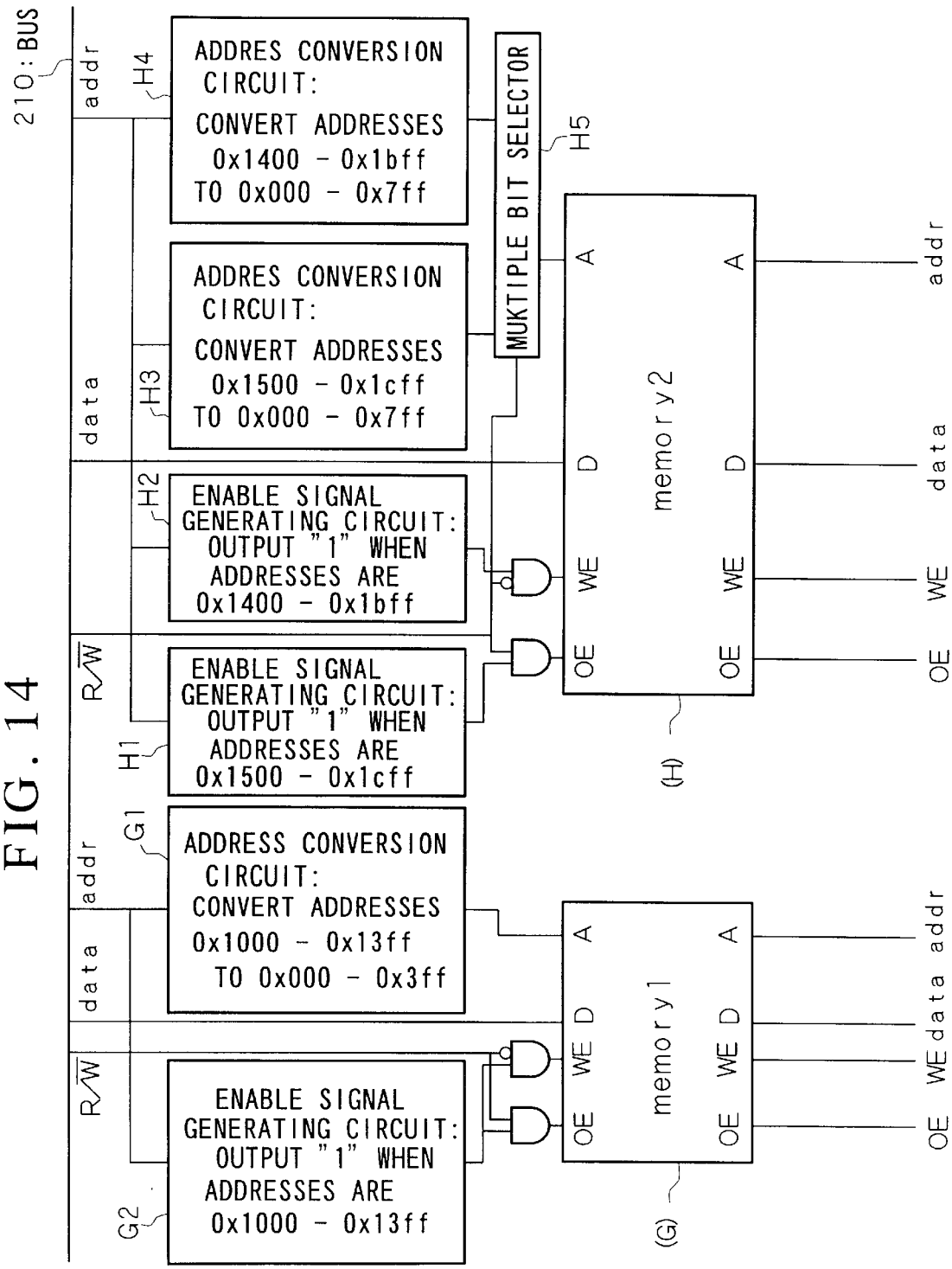
FIG. 14 shows an example of the bus interface circuit output from the bus interface circuit preparation apparatus 200.
Figure 15:
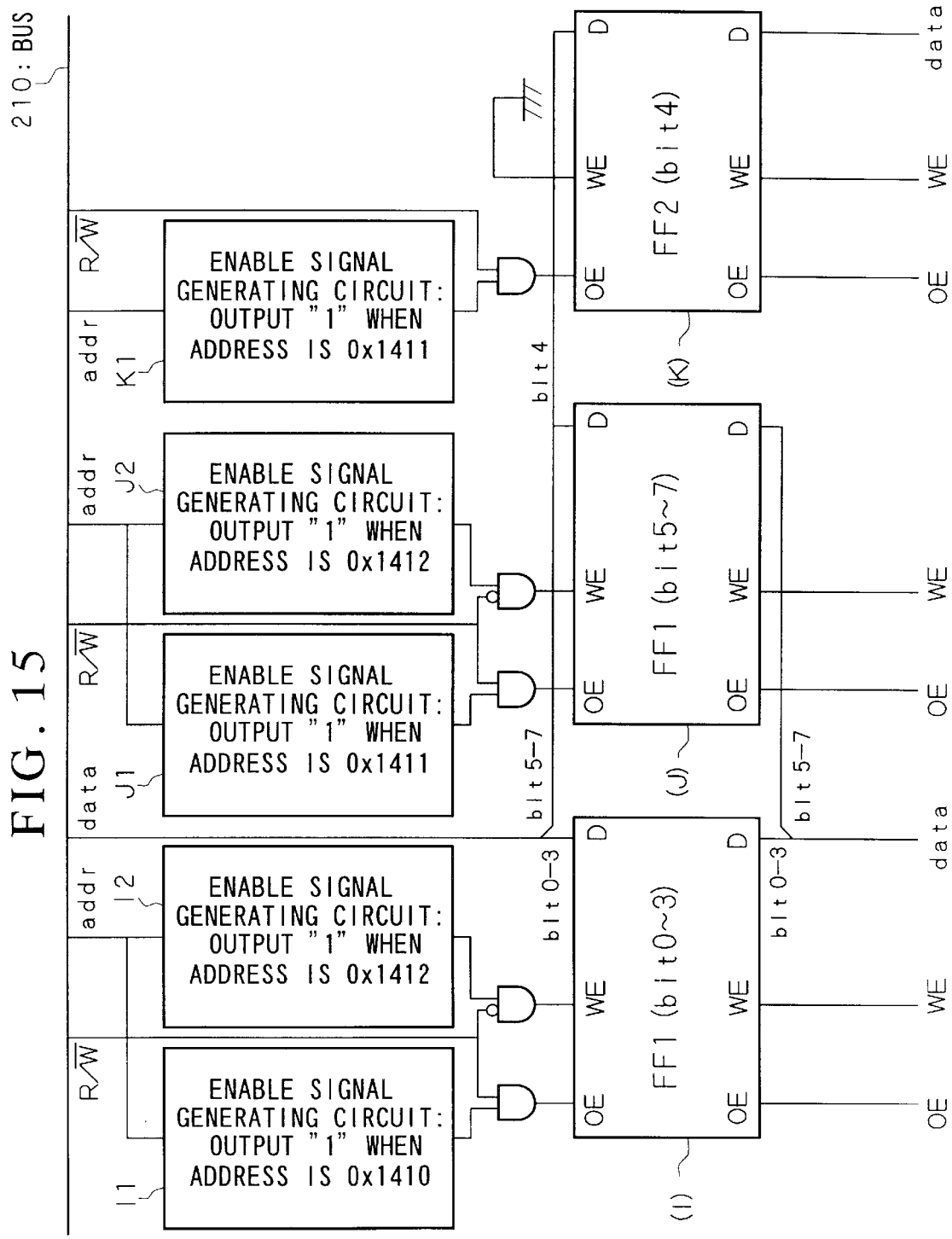
FIG. 15 shows an example of the bus interface circuit output from the bus interface circuit preparation apparatus 200.

Next, the bus interface circuit inputs from the circuit generating portion 203 are shown in FIGS. 14 and 15.

FIG. 14 is a block diagram showing the bus interface circuit of the memory 1 and memory 2. The bus 210 is connected to the CPU as the master. The memory 1 (symbol (G)) and the memory 2 (symbol (H)) are connected to the bus 210 through the bus interface circuit, output by the above-described operation.

The A (address) terminal of the memory 1 is connected to the output terminal of the address conversion circuit G1, which converts the addresses which are output from the addr (address) terminal of the bus 2 ranging 110 0x000 to 0x13ff into the addresses ranging 0x000 to 0x3ff. Furthermore, the addr (address) terminal of the bus 210 is connected to, in addition to the address conversion circuit G1, the Enable signal generating circuit G2, which outputs the active signal of "1" when the addresses output from the bus 210 are range from 0x1000 to 0x13ff. When the R/W bar signal output from the bus 210 is "1", that is, when reading, the output signal of the above-described Enable signal generating circuit is input into the OE (output enable) terminal of the memory 1 (symbol (G)). When, in contrast, the R/W bar signal is "0", that is, when writing, the output signal of the Enable signal generating circuit is input into the WE (write enable) terminal of the memory 1 (symbol (G)). In addition, the data terminal of the bus 210 is connected to the D (data) terminal of the memory 1 (symbol (G)).

Next, an explanation of the memory 2 (symbol (H)) is provided below. The enable signal generating circuit H1, which outputs the active signal "1" when the addresses output from the bus 210 in the range of 0x1500 to 0x1cff and the enable signal generating circuit H2 which outputs the active signal "1" when the addresses output from the bus 20 in the range of 0x1400 to 0x1bff are connected to the addr (address) terminal of the bus 210. The output signal of the above-described Enable signal generating circuit H1 is input into the OE (output enable) terminal, since when the R/W bar signal output from the bus 210 is "1", that is, when reading, the OE (output enable) terminal of the memory 2 (symbol (H)) is selected. When the R/W bar signal output from the bus 210 is "0", that is, when writing, the WE (write enable) terminal is selected and the output signal of the Enable signal generating circuit H2 is input.

The address conversion circuit H3 which converts the addresses from 0x1500 to 0x1cff, output from the addr (address) terminal of the bus 210, into 0x000 to 0x7ff and the address conversion circuit H4 which converts the addresses from 0x1400 to 0x1bff, output from the addr (address) terminal of the bus 210, into 0x000 to 0x7ff are connected to the addr (address) terminal of the bus 210. The output terminals of the address conversion circuit H3 and the address conversion circuit H4 are respectively connected to the input terminals of a multiple bit selector H5. In addition, by inputting the R/W bar signals into the select terminal of the multiple bit selector H5, when reading, the output signals of the address conversion circuit H4 are selected by the multiple bit selector H5 and input into the A (address) terminal of the memory 2 (symbol (H)). When reading, the output signal of the address conversion circuit H4 is selected by the multiple bit selector H5 and input into the A (address) terminal of the memory 2 (symbol (H)). Furthermore, the data terminal of the bus 210 is connected to the D (data) terminal of the memory 2 (symbol (H)).

FIG. 15 is a block diagram showing the bus interface circuit of the FF1 and FF2. The FF1 (bit 0–3, symbol (I)), FF1 (bit 5–7, symbol (J)), and FF2 (symbol (K)) are connected to the bus 210 through the respective bus interface circuits output by the above-described operation.

The data terminal of the FF1 (bit 0–3, symbol (I)) is connected to the data terminal of the bus 210, and data corresponding to the first bit to the third bit are input and output. Both of the Enable signal generating circuit I1 which outputs the active signal of "1" when the addresses output from the bus 210 is 0x1410 and the Enable signal generating circuit I2 which outputs the active signal of "1" when the address output from the bus 210 is 0x1412 are connected to the addr (address) terminal of the bus 210. When the R/W bar signal output from the bus 210 is "1", that is, when reading, the OE (output enable) terminal of the FF1 (bit 0–3) is selected for inputting the output signal of the Enable signal generating circuit I1. When the R/W bar signal is "0", that is, when writing, the WE (write enable) terminal of the FF1 (bit 0–3) is selected for inputting the output signal of the Enable signal generating circuit I2.

The D (data) terminal of the FF1 (bit 5–7) is connected to the data terminal of the bus 210, and the data corresponding to the fifth to the seventh bits are input and output. Both of the Enable signal generating circuit J1 which outputs the active signal "1" when the address output from the bus 210 is 0x1411 and the Enable signal generating circuit J2 which outputs the active signal of "1" when the address output from the bus 210 is 0x1412 are connected to the addr (address) terminal of the bus 210. When the R/W bar signal output from the bus 210 is "1", that is, when reading, the OE (output enable) terminal of the FF1 (bit 5–7, symbol (J)) is selected for inputting the output signal of the Enable signal generating circuit I1. When the R/W bar signal is "0", that is, when writing, the WE (write enable) terminal of the FF1 (bit 5–7, symbol (J)) is selected for inputting the output signal of the Enable signal generating circuit I2.

The D (data) terminal of the FF2 (bit 4, symbol (K)) is connected to the data terminal of the bus 210, and the data corresponding to the fourth bit is input and output. The Enable signal generating circuit K1 which generates the active signal of "1" when the address output from the bus 210 is 0x1411 is connected to the addr (address) terminal of the bus 210. When the R/W bar signal output from the bus 210 is "1", that is, when reading, the OE (output enable) terminal of the FF2 (bit 4, symbol K) is selected for inputting the output signal of the Enable signal generating circuit I1. The WE (write enable) terminal of the FF2 (bit 4, symbol K) is connected to the ground terminal.

Figure 16:
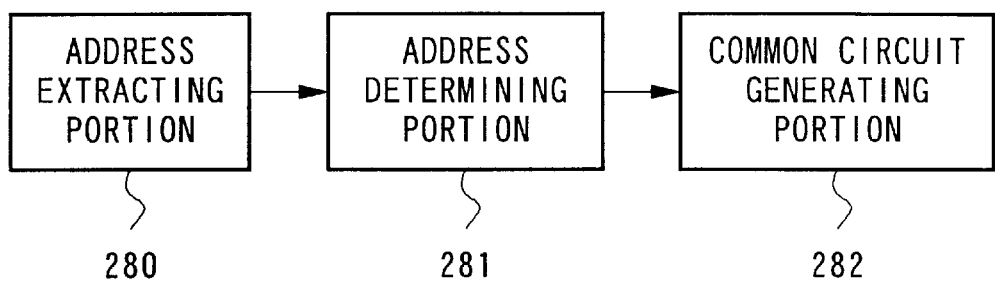
FIG. 16 is a schematic block diagram explaining the area optimization by the Enable signal generating circuit.

The area optimization of the Enable signal generating circuit according to the third embodiment of the present invention is explained below with reference to FIG. 16. FIG. 16 is a schematic block diagram explaining the area optimization of the Enable signal generating circuit of the present invention, which comprises blocks of an address extracting portion, an address determining portion, and common circuit generating portion, shown in FIG. 16 in addition to the output portion shown in FIG. 1 and the circuit generating portion shown in FIG. 11.

In this figure, reference numeral 280 denotes an address extracting portion for extracting each top address or each top address and the final addresses of the Enable signal generating circuits to form a common circuit. Reference numeral 281 denotes-an address determination portion which determines the number of higher level digits in which the addresses coincide successively from the top address when the addresses of respective Enable signal generating circuits are compared to each other from the top address to the lower positions. Reference numeral 282 denotes a common circuit generating portion for forming a common circuit of the Enable signal generating circuit based on the result of comparison by the address determination portion.

Figure 17:
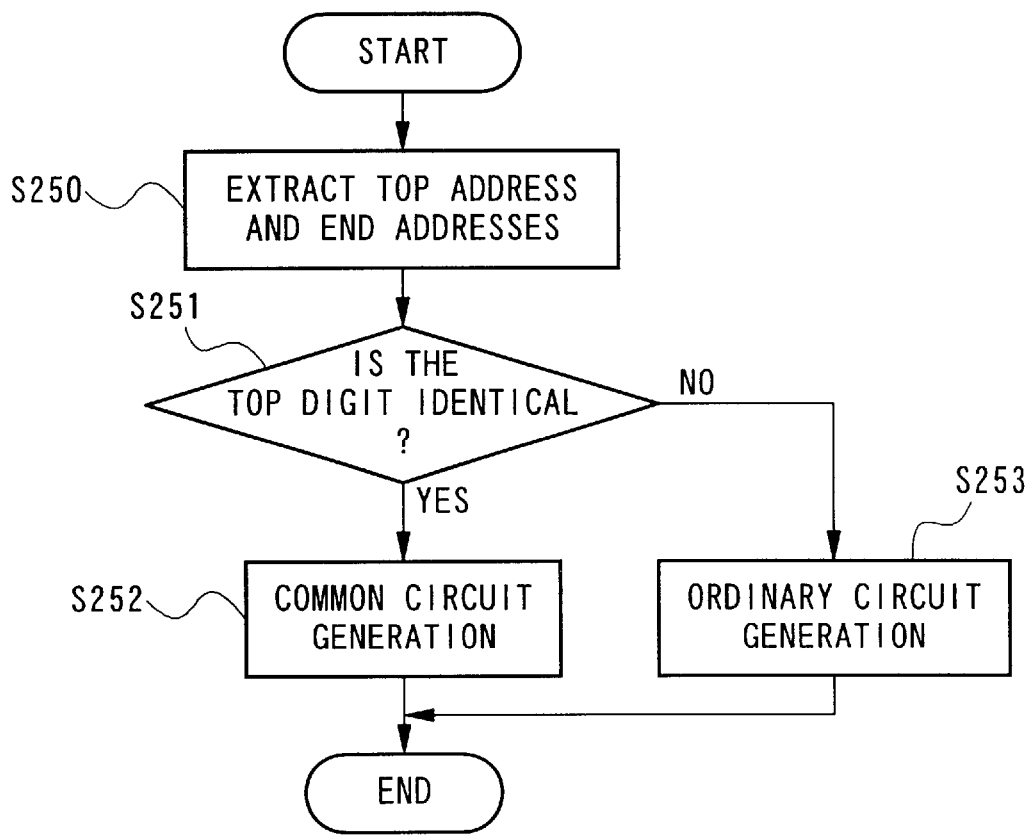
FIG. 17 is a flowchart explaining the area optimization by the Enable signal generating circuit.

An operation of the above-mentioned apparatus is described with reference to the flow-chart shown in FIG. 17. As an example of the area optimization, an optimization process is described in the case of optimizing the memory 2 (symbol (H)) shown in FIG. 14 in the Enable signal generating circuit H1 and the Enable signal generating circuit H2.

First, the address extracting portion 280 extracts four address values of the Enable signal generating circuit H1 and the Enable signal generating circuit H2 (step S250). Here, the address extracting portion 280 extracts two addresses 1500 and 1cff for the Enable signal generating circuit H1, since this Enable signal generating circuit H1 includes the addresses in the range from 0x1500 to 0x1cff. The address extracting portion also extracts two address values of 1400 and 1bff, since the Enable signal generating circuit H1 includes the addresses in the range from 0x1400 to 0x1bff.

Figure 18A:
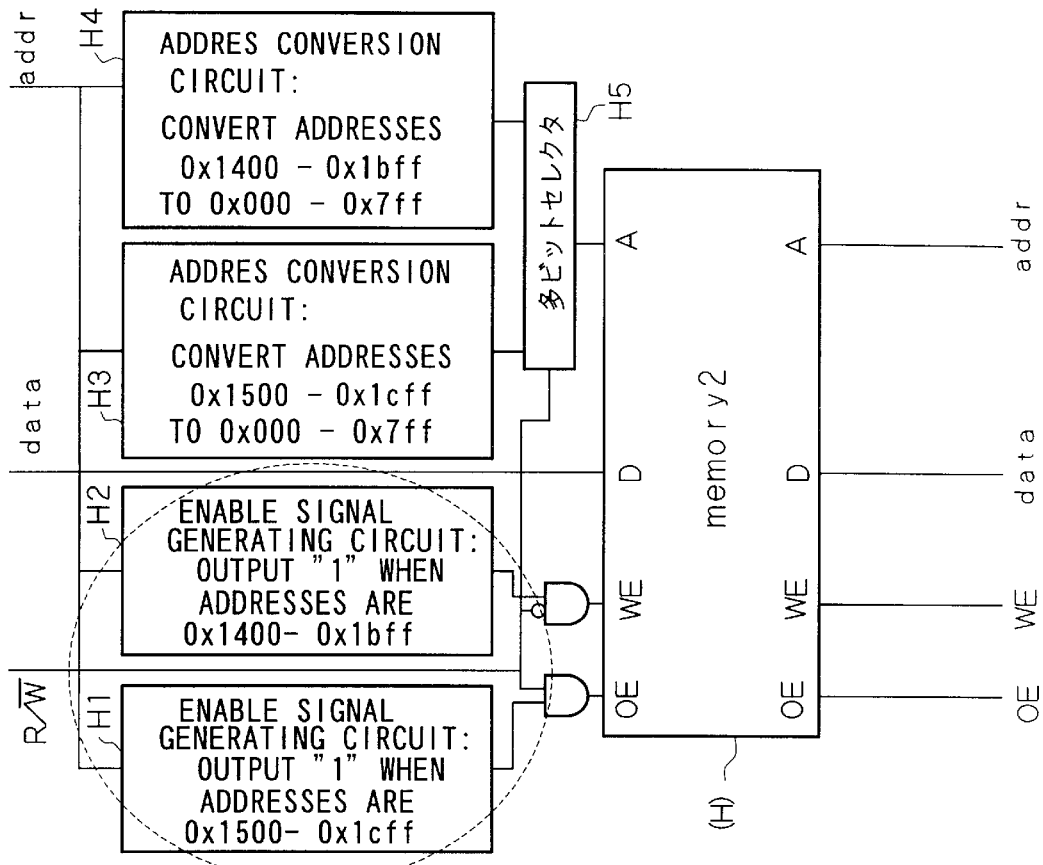
FIGS. 18A and 18B are diagrams showing the bus interface circuit after the area optimization by the Enable signal generating circuit.
Figure 18B:
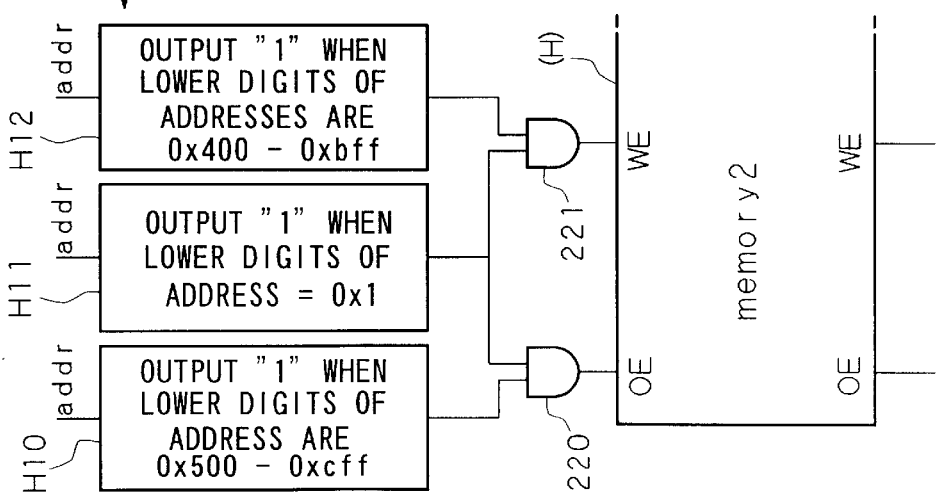

Next, the address determination portion 281 determines whether these four values coincide from the highest address in sequence (step S251). In the present case, the first digits of these four addresses have the same value of 1. Since the second highest digit for these four address are different, i.e. 5, c, 4, and b, the common circuit is generated for the identical first digit (step S252). The circuit which is generated and output by the common circuit generating portion 282 is shown in FIG. 18B. The addr (address) terminal of the bus 210 is connected to three enable signal generating circuits, and they are, an enable signal generating circuit H10, which outputs the active signal of "1" when the lower three digits output from the bus 210 are from 0x500 to 0xcff, an enable signal generating circuit H11, which outputs the active signal of "1" when the highest one digit output from the bus 210 is 0x1, and an enable signal generating circuit H12, which outputs the active signal of "1" when the lower three digits output from the bus 210 are from 0x400 to 0xbff.

Subsequently, the output of the enable signal generating circuit H10 and the output of the Enable signal generating circuit H11 are input into an AND circuit 220 and the output terminal of this AND circuit 220 is connected to the OE (output enable) terminal of the memory 2 (symbol (H)).

Furthermore, the output of the Enable signal generating circuit H11 and the output of the Enable signal generating circuit H12 are input into an AND circuit 221 and the output of this AND circuit is connected to the WE (write enable) terminal of the memory 2 (symbol (H)). The address decoder portion shown in FIG. 18B obtained by the above process is simplified when compared to the address decoder portion shown in FIG. 18A before assembling into the common circuit, and the area occupied by the circuit is reduced by the above process.

Figure 19:
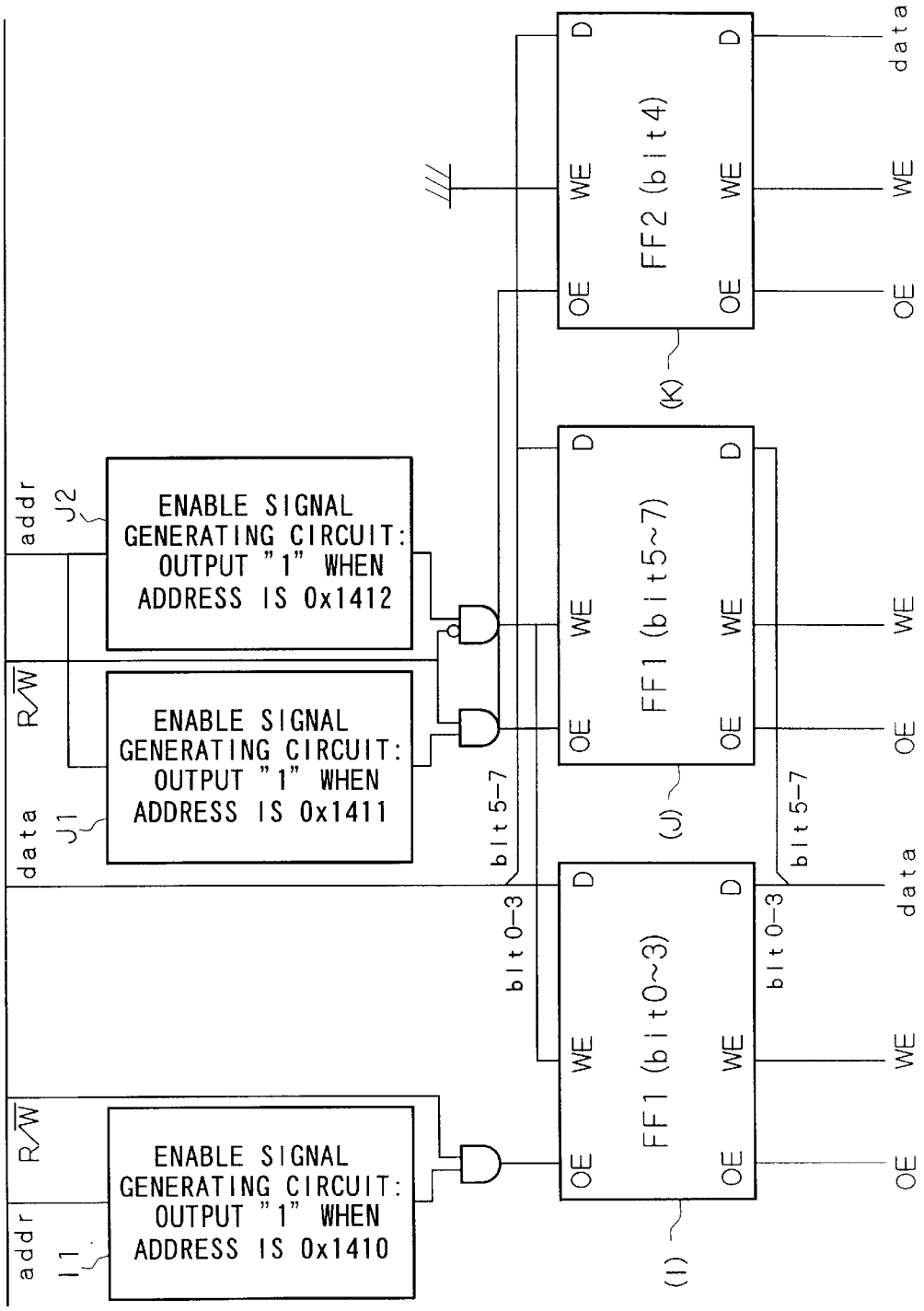
FIG. 19 is a diagram showing a common bus interface circuit converted from that shown in FIG. 15.

The common circuit diagram after assembling the circuit shown in FIG. 15 is illustrated in FIG. 19. In this case, the common circuit is formed based on the idea that two Enable signal generating circuits I2 and J2 shown in FIG. 15 output the active signal of "1" when the address of 0x1412 is commonly input. The common circuit is also formed based on the idea that two enable signal generating circuits J1 and K1 output the active signal of "1" when the common address of 0x1411 is commonly input.

Figure 20A:
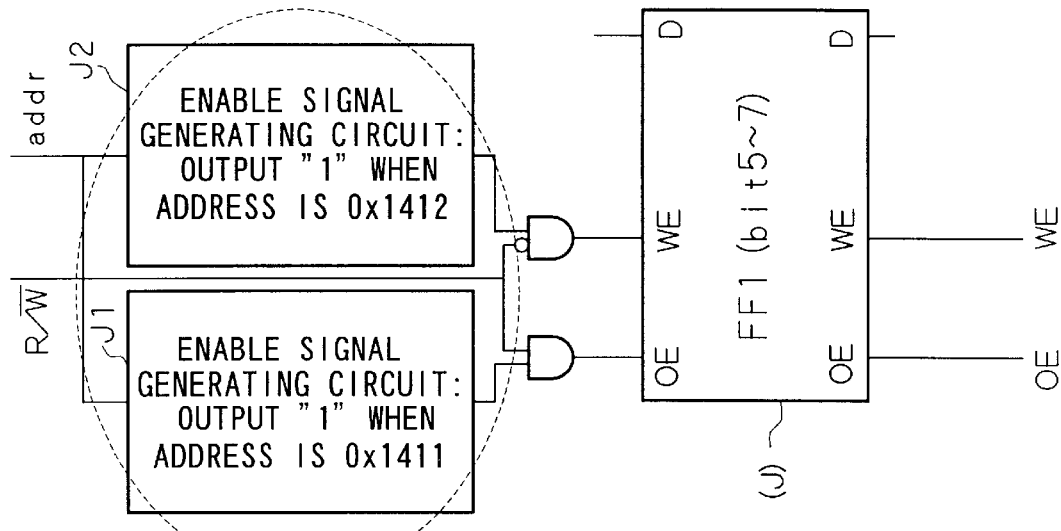
FIGS. 20A and 20B are diagrams showing the bus interface circuit shown in FIG. 19 after area optimization.
Figure 20B:
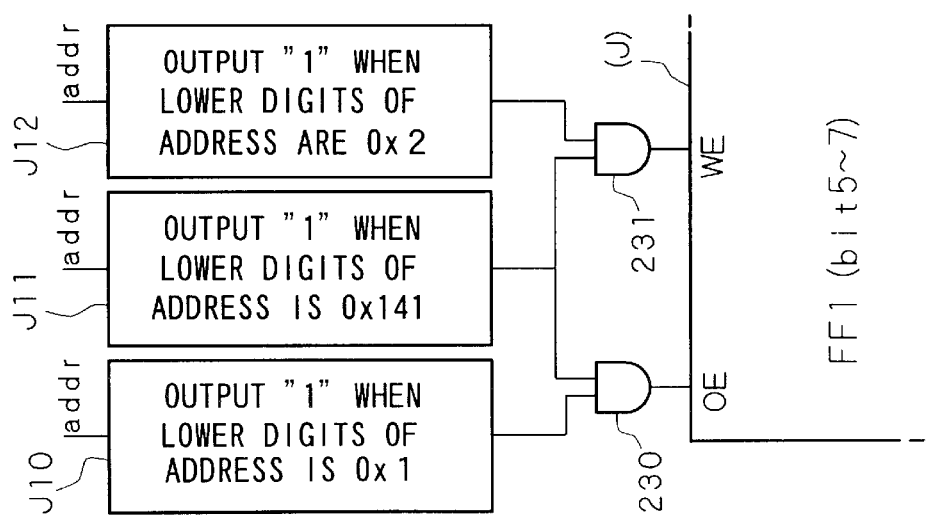

Similar to the above described process, the enable signal generating circuit J1 and the Enable signal generating circuit J2, which are both connected to FF1 (bits 5 to 7, symbol (J)) shown in FIG. 19 can be formed into the common circuit shown in FIG. 20B by executing the area optimization of the Enable signal generating circuits.

As shown in FIG. 20B, three Enable signal generating circuits are connected to the addr (address terminal) of the bus 210, that is, the Enable signal generating circuit J10 which outputs the active signal of "1" when the lower rank one digit of the address output from the bus 210 is 0x1, the Enable signal generating circuit J11, which outputs the active signal of "1" when the upper rank three digits of the address output from the bus 210 are 0x141, and the enable signal generating circuit J12, which outputs the active signal of "1" when the lower rang one digit is 0x2.

Subsequently, both outputs of the Enable signal generating circuit J10 and the Enable signal generating circuit J11 are input into the AND circuit 230 and the output of the AND circuit 230 is connected into the OE (output enable) terminal of the FF1 (bit 5–7, symbol (J)). In addition, both outputs of the Enable signal generating circuit J11 and the Enable signal generating circuit J12 are input into the AND circuit 231 and the output of the AND circuit 230 is connected into the OE (output enable) terminal of the FF1 (bit 5–7, symbol (J)). The output of the Enable signal generating circuit J11 and the output of the Enable signal generating circuit J12 are input into the AND circuit 231, and the output terminal of the AND circuit 231 is connected to the WE (write enable) terminal of the FF1 (bits 5 to 7, symbol (J)).

It is noted that, although the area optimization of the Enable signal generating circuit is executed in hexadecimal units, the area optimization can be executed using the binary units.

Figure 21:
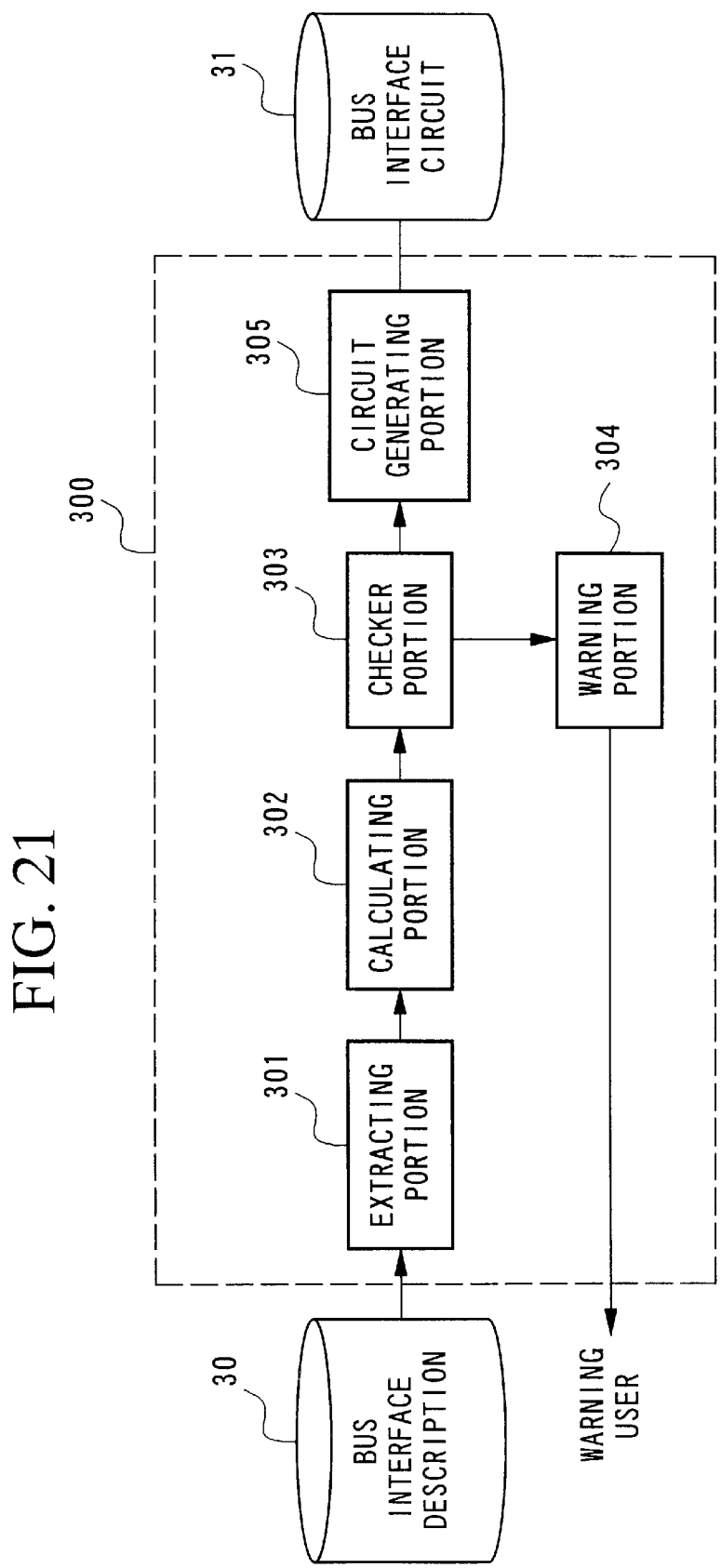
FIG. 21 shows a schematic block diagram of a system to which the bus interface preparation apparatus 300 of the present invention is applied.

FIG. 21 is a schematic block diagram showing a system to which the bus interface circuit preparation apparatus 300 according to the fourth embodiment is applied.

Reference numeral 301 denotes an extracting portion for extracting the top global address, the address range, and the address width for the memory element from an input bus interface description. Reference numeral 302 denotes a calculation portion for calculating the minimum number n of the address lines capable of assigning the address range extracted by the extracting portion. Numeral 303 denotes a checker portion for checking whether the lower n bits are 0. Numeral 304 denotes an alarm portion for warning the user when there is 1 in the lower bits.

Numeral 305 denotes a circuit generation portion for generating a bus interface circuit 31 by generating Enable signal circuits using the addresses excluding the Enable signal generating circuit using address values of the global address except the lower n bits when the result of the detection at the checker portion indicates that the lower n bits of the top address of the memory are all 0.

The operation of the apparatus constituted as described above is explained with reference to the flow-chart shown in FIG. 22. In this explanation, it is assumed that the address signal lines at the bus side have 16 bits. First, an explanation is provided when the bus interface description 30 is input into a memory element, whose name is memory 1, whose top global address is 0x1400, and whose addresses range from 0x1400 to 0x17ff.

First, when the bus interface description 30 is input (step S301), the extracting portion extracts the top address and the memory size of the memory element from the bus interface description 30 (step S302) for outputting to the calculating portion 302. The calculating portion 302 then obtains the minimum address line number n from the memory size extracted by the extracting portion 301 (step S303). In the present case, the memory size is 1024 bites and the top address is 0x1400. Next, the calculating portion 302 obtains the minimum address line number from the memory size of 1024. Since the memory size is 1024, the minimum address line n=10 is obtained from the calculation of a formula, $2^n=1024$.

Based on the minimum address line number n of 10, the checker portion checks whether all of the 10 lower bits of the top address are 0 (step S304).

The top address 0x1400 is represented in binary notation as 0001, 0100, 0000, 0000, . . . (the symbol (7)). Thus, the checker portion checks that the 10 lower bits are all 0 (step S305), and outputs the detected result to the circuit generation portion 305.

Subsequently, when the circuit generating portion 305 receives the result from the checker portion, the circuit generating portion 305 generates a circuit shown in FIG. 23. The lower 10 bits of the 16 bit signal lines of the bus 310 are connected to the address input terminal of the memory 1 (symbol (a)). An Enable signal generating circuit is generated which outputs "1" when it is confirmed that the remaining higher 6 bits of the 16 address signal lines are identical to the upper 6 bits of the top address of the memory element. In the present case, since the upper 6 bits are 0001 01, the Enable signal generating circuit is generated when the comparison between these upper 6 bits and the upper 6 bits of 0x05 of the top address of the memory element. The output signal of the above-described Enable signal generating circuit is input into any one of the OE (output enable) terminal or the WE (write enable) terminal according to the output of the R/W bar signal output from the bus 310. That is, when the R/W bar signal output from the bus 310 is "1", that is, when reading is conducted, the OE (output enable) terminal is selected, and when the R/W bar signal output of the bus 310 is "0", that is, when writing is conducted, the WE (write enable) terminal is selected.

As described above, since the circuit generating portion 305 prepares the Enable signal generating circuit from the upper 6 bits of the address signal, according to the determination result by the checker portion, the Enable signal generating circuit can be constituted by a single comparator 1. Furthermore, since the address conversion circuit is not generated, it is possible to generate a bus interface circuit having a smaller area.

Figure 22:
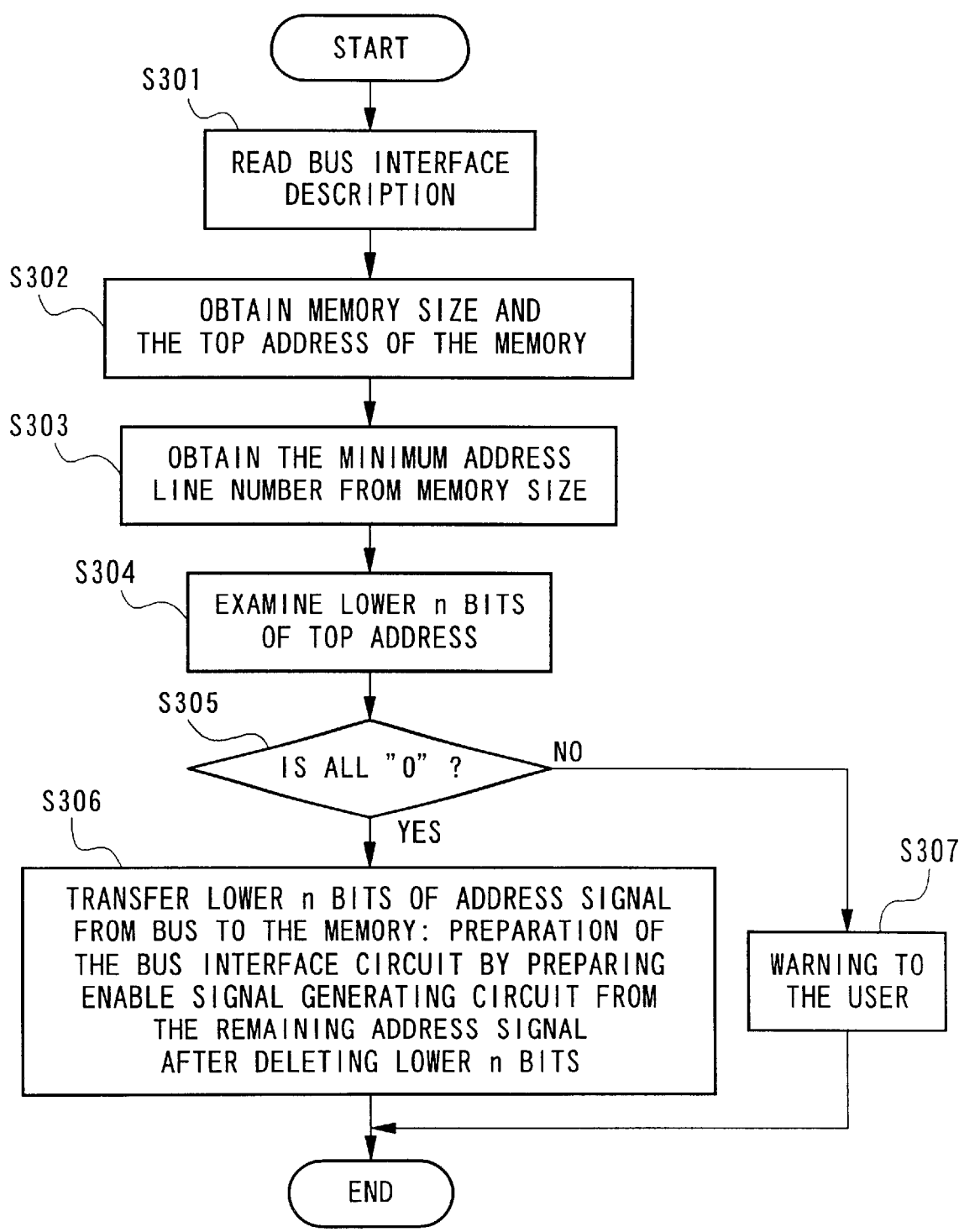
FIG. 22 is a flow chart explaining the operation of the system to which the bus interface preparation apparatus 300 shown in FIG. 21 is applied.

Next, an explanation is provided for when the bus interface description 30 is input into the memory element, whose name is memory 2, whose top global address is 0x1401, and whose address range extend from 0x1401 to 0x1800 with reference to FIGS. 21 and 22.

When the bus interface description 30 I input (step S301), the extracting portion extracts from the bus interface description the top address and the memory size of the memory element for outputting to the calculating portion 302.

Subsequently, the calculating portion 302 determines the minimum address line number n (step S303) from the memory size extracted by the extracting portion 301. In the present case, the memory size is 1024 bites and the top address is 0x1401. Subsequently, the calculating portion 302 acquires the minimum address line number from the memory size of 1024. The minimum address number is determined as 10 by calculating the equation of $2^n=1024$.

Based on the minimum address line number of 10 acquired by the calculating portion 302, the checker portion checks whether the lower 10 bits of the top address 0x1401 is 0 (step S 304).

The top address 0x1401 can be represented in binary notation as, 0001 0100 0000 0001 (symbol (8)). Thus the checker portion detects that 1 exists in the lower 10 bits of the binary notation (symbol((8))(step S305), and issues a warning to the user (step S307).

Figure 23:
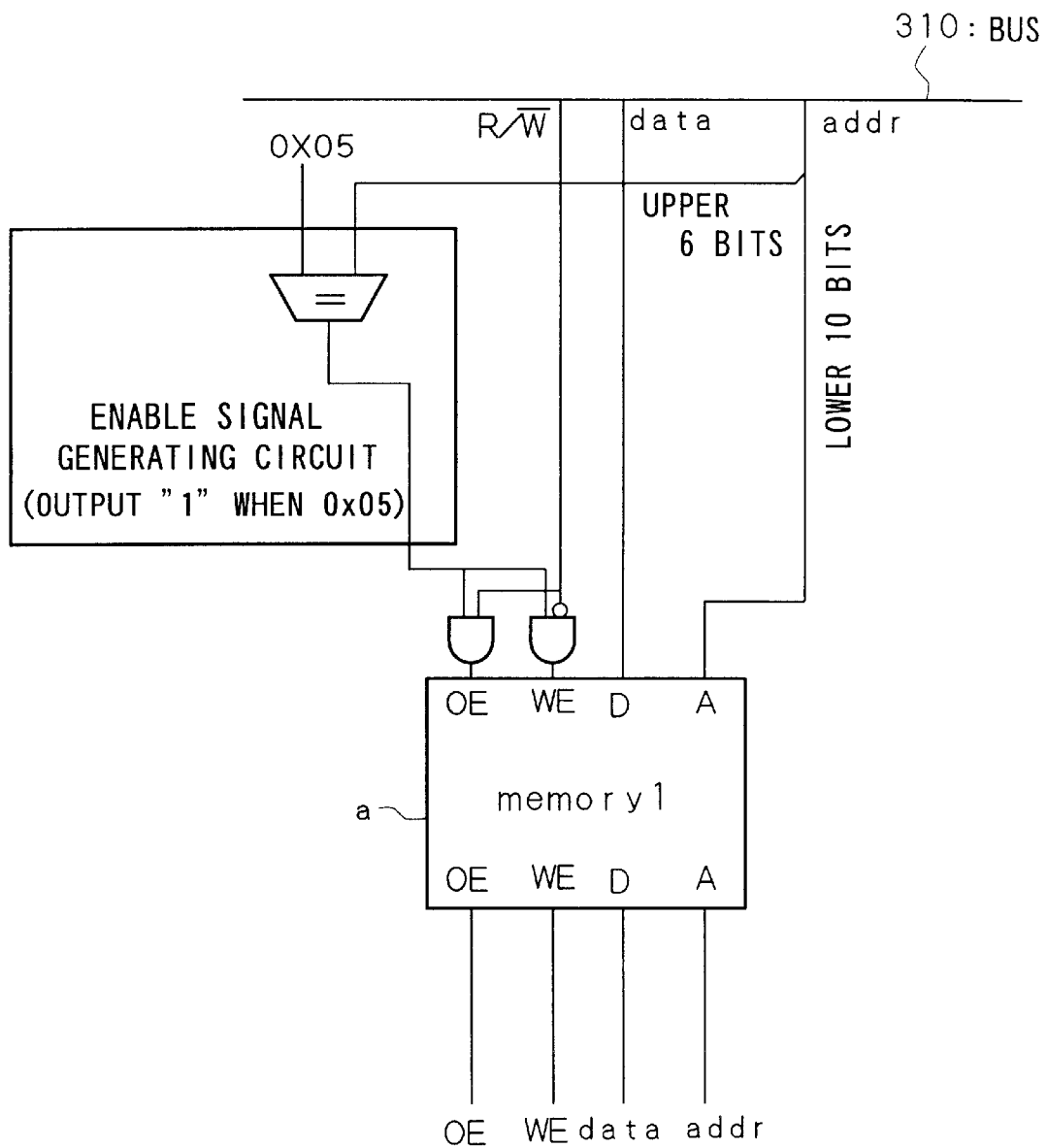
FIG. 23 shows an example of the bus interface circuit output by the bus interface circuit preparation apparatus 300.
Figure 24:
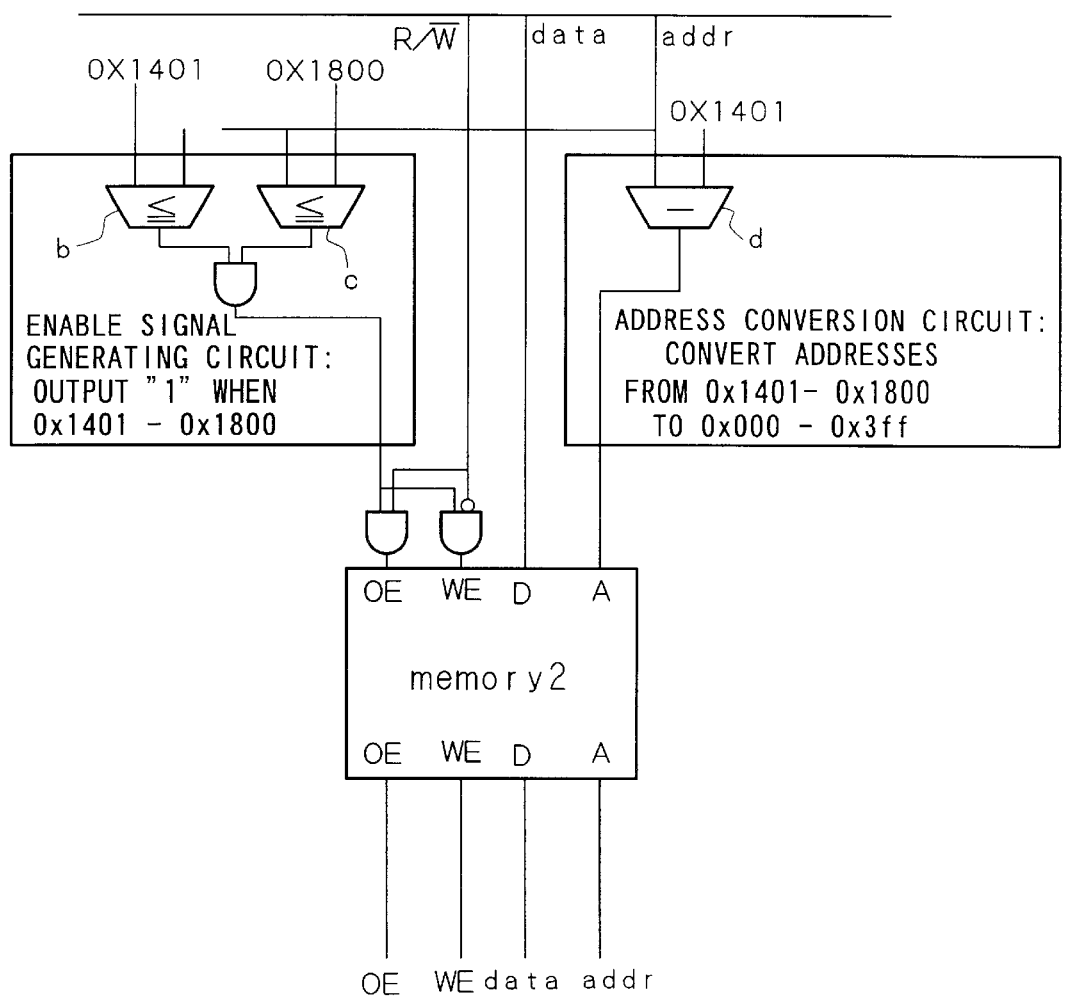
FIG. 24 is a bus interface circuit for comparison with the bus interface circuit shown in FIG. 23.
Figure 25:
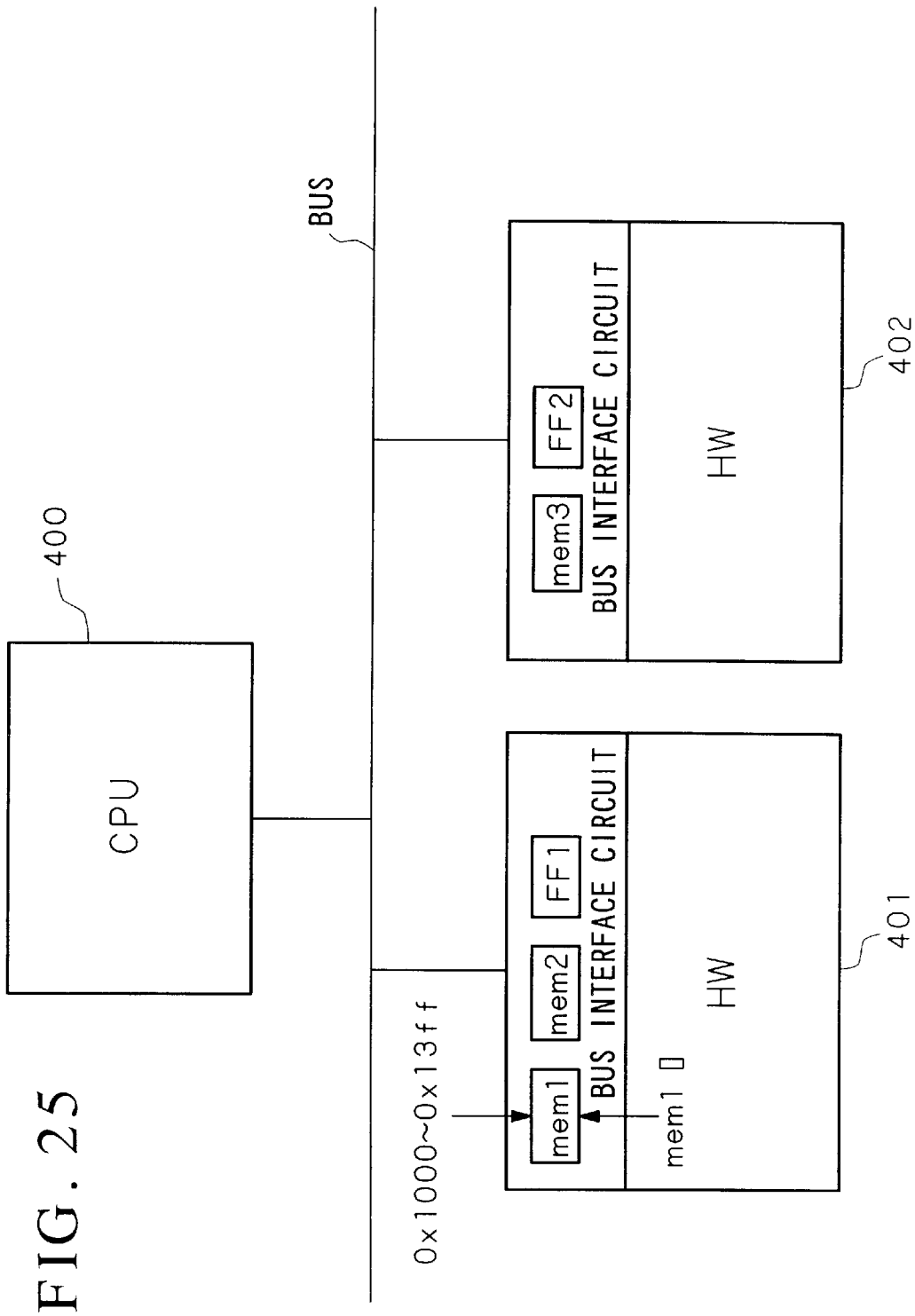
FIG. 25 is a schematic block diagram showing the conventional technique.
Figure 26:
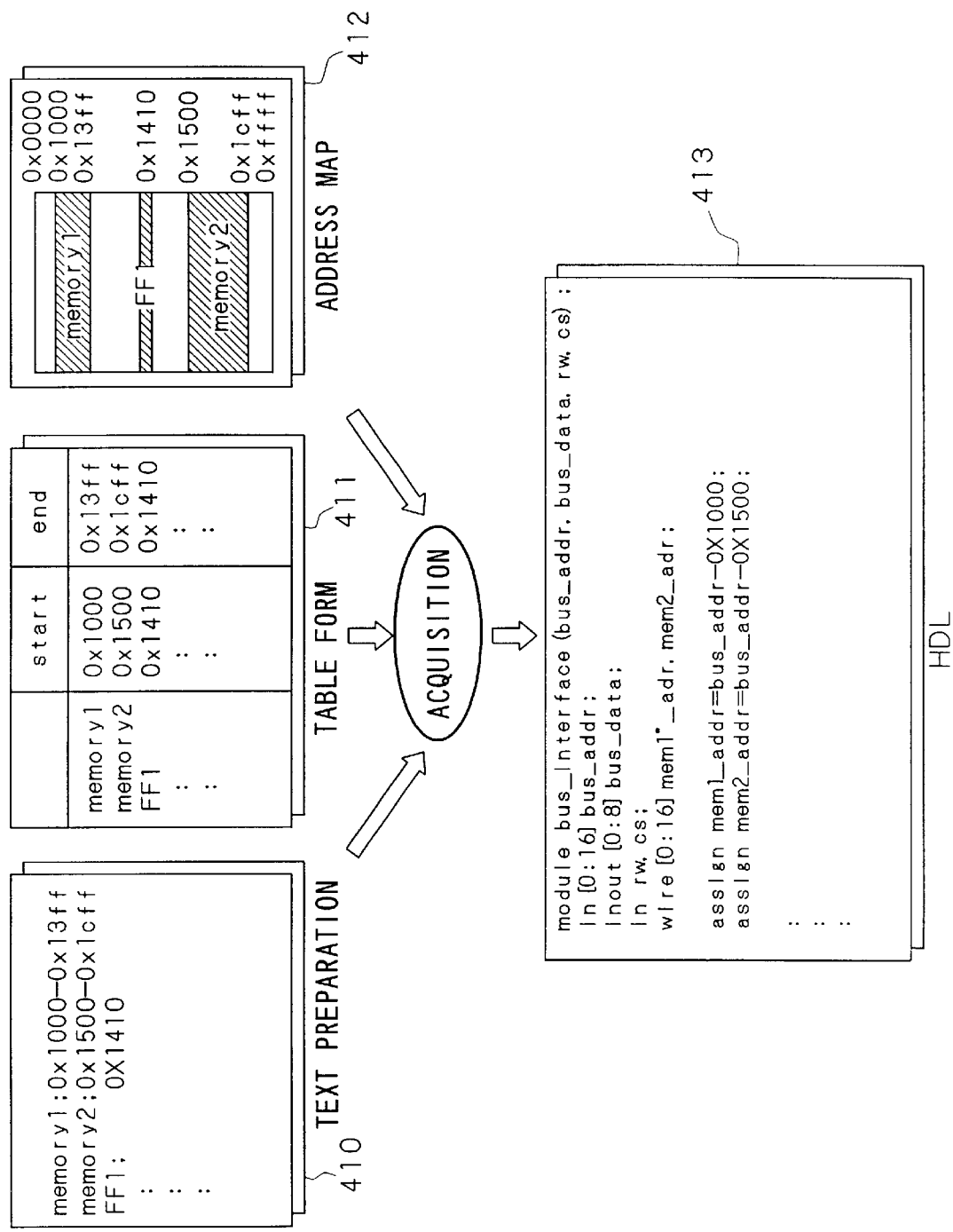
FIG. 26 is a schematic block diagram showing the conventional technique.

In order to compare with the bus interface circuit shown in FIG. 23, the bus interface circuit prepared with regard to the memory 2 is shown in FIG. 24. As shown in FIG. 24, it is necessary for the Enable signal generating circuit to be provided with two comparators, including one comparator b for comparing the global address with the address of 0x1402 and the other comparator c for comparing the global address with the address of 0x1800. In addition, it is also necessary to provide a subtracter d in this case. Therefore, the size of the circuit in this case becomes far larger than that of the circuit shown in FIG. 23. This invention makes it possible to warn the user about the large circuit size shown in FIG. 24, so that this invention prevents the circuit from expanding to an unnecessarily large size.

Furthermore, it is possible to manage execution of the preparation process by recording the program for realizing the function of the bus interface circuit preparation apparatus into computer readable recording media, inputting the program into a computer system, and performing the program. The above-described "computer system" includes OS and hardware of peripheral equipment. The above "computer system" also includes a home page provision environment (in other words, a display environment), when this system utilizes the WWW system.

The "computer readable recording media" include various portable media such as floppy discs, optical magnetic discs, ROMs, and CD-ROMs, and memory devices such as hard discs installed in computers. The "computer readable recording media" also include a memory device, which is capable of storing the program for a certain period of time, such non-volatile memory devices (RAM) in computer systems used as the server or client in the case of communicating the program through telecommunication lines such as internet network or telephone line. The above-described program may be communicated from one computer system storing the program in its memory device to another computer system through transmission media or through carrier wave of transmission media. Here, "transmission media" means media which possess a function of transmitting information such as a communication network such as the internet or a communications network such as telephone lines.

The above-described program may be a program which realizes a portion of the above-mentioned function or may be what is called a difference program (a difference file) which can realize the function by combining it with a program which is already stored in the computer system. The CPU may be any hardware if it has a function capable of efficiently controlling the slave hardware such as direct memory access controllers.

As described above, embodiments of the present invention are described in detail with reference to the attached drawings, but the practical structure of the present invention is not limited to those embodiments and variants thereof may be envisaged without departing from the scope of the present invention.

As described above, since the present invention is constituted such that the extracting portion extracts the data related to the address of the memory element from the inputting bus interface description, the memory element stores the allocated addresses based on the data related to the address in the bit data memory portion, and the address competition detecting portion detects whether the addresses of the data extracted by the extracting portion are identical with the addresses stored in the data memory portion, the present invention can design the bus interface under the conditions that the addresses in the memory element, which is read and written from the computer do not compete with each other. In addition, it is possible to warn the user about the competition of the addresses when the competition is generated by an operational mistake. The above-described effects can be obtained on various occasions such as at the time of new design, at the time of changing the base address, and at the time of changing the memory size.

According to the present invention, the state of the arrangement of the address can be visually ascertained by displaying in a screen by use of a GUI (Graphical User Interface) based on the address information extracted by the extracting portion.

What is claimed is:

1. A bus interface circuit preparation apparatus, which outputs a hardware description language expressing said bus interface circuit by inputting a description of a bus interface including a memory element which is disposed between a central processing unit constituting a master and hardware constituting a slave for said central processing unit, comprising:

an extracting portion for extracting data related to the address range of said memory element;

a bit data memory portion for storing addresses allocated to said memory element based on the data extracted by said extracting portion;

an address competition detecting portion for detecting duplication of addresses in the memory element based on the data extracted by said extracting portion and the address information stored in said bit data memory portion; and a circuit generating portion for generating a description of a bus interface that prevents duplication of addresses of the memory element.

2. A bus interface circuit preparation apparatus according to claim 1, wherein said apparatus comprises:

an extracting portion for extracting data related to global addresses of said select signal; and an address determining portion for determining the number of upper digits which are identical from the top address, when a reading global address and a writing global address are represented by n-ary notation based on the data extracted by said address extracting portion, and when both said reading and writing global addresses after conversion to the n-ary notation are compared from the top address; and a common circuit generating portion for generating common circuits of select signals corresponding to the number of upper digits determined by said address determining portion.

3. A bus interface circuit preparation apparatus, which outputs a hardware description language expressing said bus interface circuit by inputting a description of a bus interface including a memory element which is disposed between a central processing unit constituting a master and hardware constituting a slave for said central processing unit, comprising:

an RW address comparison portion for determining whether a reading global address and a writing global address, both allocated to the same memory element, are identical, based on the inputted bus interface description;

a determination portion for determining whether or not said reading global address and said writing global address are divided to form different addresses in the bit unit; and a select signal generating circuit for outputting the select signal which becomes active when said global address is assigned, providing that said reading global address and said writing global address are identical and that said global addresses are different addresses in the bit unit, and a circuit generating portion for generating conversion circuits corresponding to each of said global addresses for converting said global addresses to local addresses of said memory element.

4. A bus interface circuit preparation apparatus, which outputs a hardware description language expressing said bus interface circuit by inputting a description of a bus interface including a memory element which is disposed between a central processing unit constituting a master and hardware constituting a slave for said central processing unit, comprising:

an RW address comparison portion for determining whether a reading global address and a writing global address, both allocated to the same memory element, are identical;

a determination portion for determining whether said reading global address and said writing global address are divided to form different addresses in the bit unit; and a select signal generating circuit for outputting the select signal which becomes active when said global address is assigned, providing that said reading global address and said writing global address are different addresses and that respective addresses of said reading global address are identical to said writing global address, and a circuit generating potion for generating conversion circuits corresponding to said writing global address and said writing global address for converting said global addresses to local addresses of said memory element.

5. A bus interface circuit preparation apparatus, which outputs a hardware description language expressing said bus interface circuit by inputting a description of a bus interface including a memory element which is disposed between a central processing unit constituting a master and hardware constituting a slave for said central processing unit, comprising:

an RW address comparison portion for determining whether or not a reading global address and a writing global address, both allocated to the same memory element, are identical;

a determination portion for determining whether said reading global address and said writing global address are divided to form different addresses in the bit unit; and a select signal generating circuit for outputting the select signal which becomes active when any one of said reading global address and said writing global address, which form different addresses in the bit unit, is assigned, provided that said reading global address and said writing global address are different addresses and that at least any one of said reading global address and said writing global address forms different addresses in the bit unit, and a circuit generating portion for generating conversion circuits corresponding to each of said reading global addresses and to each of said writing global addresses for converting said global address to local addresses of said memory element.

6. A bus interface circuit preparation apparatus, which outputs a hardware description language expressing said bus interface circuit by inputting a description of a bus interface including a memory element which is disposed between a central processing unit constituting a master and hardware constituting a slave for said central processing unit, comprising:

an extracting portion for extracting a top global address and an address range for said memory elements from the inputted bus interface description;

a calculating portion for calculating the number of the minimum address lines which is capable of assigning any address in said address range extracted by said extracting portion;

a checker portion for determining whether all of the lower n bits are 0; and a circuit generating portion for outputting the select signal, using the lower n bits of said global addresses as the address input of said memory element and utilizing said global address values excluding the lower n bits, when said checker portion has determined that all of the lower n bits are 0.

7. A bus interface circuit preparation apparatus, which outputs a hardware description language expressing said bus interface circuit by inputting a description of a bus interface including a memory element which is disposed between a central processing unit constituting a master and hardware constituting a slave for said central processing unit, comprising:

an extracting portion for extracting a top global address and tan address range of said memory element from the bus interface description; a calculating portion for calculating the number of minimum address lines, capable of assigning individually any address within said address range extracted by said extracting portion;

a checker portion for determining whether all of the lower n bits are 0; and a warning portion for warning when 1 is present in said lower n bits.

8. A computer readable recording medium which stores a bus interface circuit preparation program for outputting a hardware description language expressing said bus interface circuit by inputting a description of a bus interface including a memory element which is disposed between a central processing unit constituting a master and hardware constituting a slave for said central processing unit, wherein the bus interface circuit preparation program operated by a computer comprises:

an extracting step for extracting data related to the address range of said memory element from the inputting bus interface description;

a bit data storing step for storing the addresses allocated to said memory element based on the data extracted by said extracting portion;

an address competition detecting step for detecting duplication of the addresses in the memory element based on the data extracted by said extracting portion and information stored in said bit data storing step; and a circuit generating step for generating a description of a bus interface that prevents duplication of addresses of the memory element.

9. A computer readable recording medium which stores a bus interface circuit preparation program for outputting a predetermined hardware description language by inputting a description of a bus interface including a memory element which is disposed between a central processing unit constituting a master and hardware constituting a slave for said central processing unit, wherein the bus interface circuit preparation program comprises;

an RW address comparing step for determining whether or not a reading global address and a writing global address, both allocated to the same memory element, are identical, based on the inputted bus interface description;

a determining step for determining whether or not said reading global address and said writing global address are divided to form different addresses in the bit unit; and a circuit generating step for outputting the select signal when said global address is assigned, providing that said reading global address is identical with said writing global address and that said global addresses are different addresses in the bit unit, and for generating conversion circuits corresponding to each of said global addresses for converting said global addresses to local addresses of said memory element, when necessary;

a circuit generating step for outputting the select signal which becomes active when any one of said two global addresses are assigned, providing that said reading global address and said writing global address are different addresses and that respective addresses of said reading global address are identical with said writing global address, and for generating conversion circuits corresponding to said reading global address and said writing global address for converting said global addresses to local addresses of said memory element; and a circuit generating step for generating a select signal generating circuit for outputting the select signal which becomes active when any one of said reading global address and said writing global address, which form different addresses in the bit unit, is assigned, providing that said reading global address and said writing global address are different addresses and that at least any one of said reading global address and said writing global address forms different addresses in the bit unit, and for generating conversion circuits corresponding to each of said reading global address and to each of said writing global address for converting said global addresses to local addresses of said memory element.

10. A recording medium which stores a bus interface circuit preparation program according to claim 9, wherein said bus interface circuit preparation program comprises:

an address extracting step for extracting data related to the global address of said select signal generated in an address extracting step;

an address determination step for determining whether these reading and writing global addresses agree with each other from the upper address based on data extracted by said address extracting step; and a common circuit generating step for generating a common circuit of said select signal when the result of said address determination step confirms the agreement.

11. A computer readable recording medium which stores a bus interface circuit preparation program for outputting a predetermined hardware description language by inputting a description of a bus interface including a memory element which is disposed between a central processing unit constituting a master and hardware constituting a slave for said central processing unit, wherein the bus interface circuit preparation program comprises;

an extracting portion for extracting a top global address and an address range of said memory element from the bus interface description;

a calculating portion for calculating the number of minimum address lines, capable of assigning individually any address within said address range extracted by said extracting portion;

a checker portion for determining whether all of the lower n bits of the top address of said memory element are 0;

a circuit generating step for outputting a select signal, by using the lower n bits as an address input of the memory element, when the result of the determination in said check step indicates that the lower n bits of the top global address are all 0; and a warning step for warning the user when the result of the check step indicates that 1 is present in the lower n bits of the top address.

* * * * *